United States Patent
Wilkinson

(10) Patent No.: US 10,025,282 B1
(45) Date of Patent: Jul. 17, 2018

(54) SMART COOKING DEVICE AND SYSTEM WITH COOKWARE IDENTIFICATION

(71) Applicant: Matthew T. Wilkinson, Kirkland, WA (US)

(72) Inventor: Matthew T. Wilkinson, Kirkland, WA (US)

( * ) Notice: Subject to any disclaimer, the term of this patent is extended or adjusted under 35 U.S.C. 154(b) by 294 days.

(21) Appl. No.: 15/080,764

(22) Filed: Mar. 25, 2016

Related U.S. Application Data

(60) Provisional application No. 62/138,087, filed on Mar. 25, 2015.

(51) Int. Cl.
*G05B 19/042* (2006.01)
*H04L 29/08* (2006.01)

(52) U.S. Cl.
CPC .......... *G05B 19/042* (2013.01); *H04L 67/125* (2013.01); *H04L 67/141* (2013.01); *G05B 2219/2643* (2013.01)

(58) Field of Classification Search
None
See application file for complete search history.

(56) References Cited

U.S. PATENT DOCUMENTS

| | | | |
|---|---|---|---|
| 2012/0118874 A1* | 5/2012 | Williams | H05B 6/1209 219/620 |
| 2013/0112683 A1* | 5/2013 | Hegedis | A47J 27/62 219/660 |
| 2014/0170275 A1* | 6/2014 | Bordin | G09B 19/24 426/233 |
| 2015/0290795 A1* | 10/2015 | Oleynik | G05B 19/42 700/257 |
| 2016/0051078 A1 | 2/2016 | Jenkins et al. | |
| 2016/0066744 A1 | 3/2016 | Baxi et al. | |

OTHER PUBLICATIONS

"A $99 Gadget that Makes your Oven Way Smarter", Margaret Rhodes Design, Jun. 24, 2014, printed from internet Mar. 13, 2016: http://www.wired.com/2014/06/turn-your-old-oven-into-a-smart-oven-with-this-99-gadget/.
"CES 2014: Smart kitchens: use your range long-range", Johnny Yu, Reviewed.com / USA Today, Jan. 6, 2014.
Alix Wall, "Smart Pan Creator hopes to Revolutionize Cooking with SmartyPans", Sep. 25, 2014, http://ww2.kqed.org/bayareabites/2014/09/25/smart-pan-creator-hopes-to-revolutionize-cooking-with-smartypans/.
Samantha Raphelson, Weekly Innovation: A Smart Pan that Helps you Cook like a Chef: All Tech Considered: NPR, published Dec. 3, 2014.

* cited by examiner

*Primary Examiner* — Mohammad Ali
*Assistant Examiner* — Bernard G Lindsay
(74) *Attorney, Agent, or Firm* — Fox Rothschild LLP

(57) ABSTRACT

A cooking system includes a smart cooking device that interfaces with a remote computing device. The smart cooking device includes a heat transfer housing that is configured to receive a cookware item and be positioned over a heating element of an appliance. Various sensors of the smart cooking device such as a force sensor, a vibration sensor and/or a temperature sensor measure data associated with a cooking process performed when the heating element is operating and the cookware item holds food. The data is passed to the remote computing device for storage as a digital recipe. The digital recipe may then be played back to guide a user in a future cooking process.

17 Claims, 19 Drawing Sheets

SMART COOKING DEVICE AND SYSTEM WITH COOKWARE IDENTIFICATION

RELATED APPLICATIONS AND CLAIM OF PRIORITY

This patent document claims priority to U.S. Provisional Patent Application No. 62/138,087, filed Mar. 25, 2015, titled "Smart Cooking Device." The disclosure of the priority application is incorporated into this document by reference.

BACKGROUND

The present disclosure relates to an appliance having incorporated circuitry for providing information related to a cooking process associated with and involving a separate item of cookware (such as a pot or pan) and a cooking appliance (such as a gas or electric range, or a grill) and associated software for interacting with such a smart cooking appliance.

As technology related to data and device interconnectivity advances, associated components have become smaller, cheaper, and more efficient. Such an advancement has led to the interconnectivity of many modern day devices. Such devices are typically referred to as "smart" devices. For example, cellular telephones, televisions, mobile computing devices such as tablets, thermostats, and appliances such as refrigerators have been or are currently integrating communication interface components that allow the devices to operably connect to a communications network such as a Wi-Fi network, thereby accessing additional networks such as an intranet or the Internet.

However, it is not always desirable to connect all products. For example, a typical kitchen may contain numerous cookware items. It can be very expensive for a typical household to acquire multiple smart cookware items. And the time and effort needed to set up each item and connect it to the other devices can be daunting. In addition, the information gathering and analysis ability of dedicated devices can be limited to a single mode, and cannot change over time based on the environment or capabilities of other devices are not generally responding to small or subtle changes by a user of the device. Alternatively, information gathering and analysis can be limited to monitoring user activities in a fixed environment, e.g., running an application or a browser on a computing device such as a smartphone.

In light of these prior art deficiencies, there is a need for a smart device that can dynamically monitor, quantify and record a user's cooking action in real time, even when the user's action is unexpected or unanticipated, regardless of the cookware or cooking appliance that is being used. Additionally, there is a need for an analysis, recordation and display system to accompany such a smart device.

SUMMARY

In an embodiment, a cooking system includes a smart cooking device having a heat transfer housing and a heat resistant housing. The heat transfer housing includes a first side configured to fit over a heating element of a cooking appliance and an opposing second side configured to receive a cookware item. The heat transfer housing is configured to pass heat from the heating element to the cookware item when the heat transfer housing is positioned over the heating element. Various sensors that include at least a force sensor are connected to, or contained within, the heat transfer housing. The sensors are configured to measure quantifiable data associated with a cooking process performed when the heating element is operating and the cookware item holds food. The sensors are communicatively connected to a communication device that is at least partially contained within the heat resistant housing. The communication device is configured to establish a communicative connection with a remote computing device, to receive cooking process information from the sensors, and to transmit the cooking process information to the remote computing device.

The cooking system also may include the remote computing device, which will include a processing device and a non-transitory, computer-readable medium operably connected to the processing device and configured to store one or more instructions for execution by the processing device during operation. The instructions may be configured to cause the remote computing device to receive, force data associated with the cooking process from the force sensor, receive temperature data associated with the cooking process from a temperature sensor, and receive time data from an internal or external clock or time stamp data. The remote computing device will also include a user interface to receive user input that is descriptive of steps of the cooking process. The remote computing device will correlate the force, temperature and time data with the described steps to generate a recipe associated for the cooking process. The remote computing device will also create and store a digital recipe file of the recipe for the cooking process based on the correlated vibration, force, temperature and time data.

In some embodiments, the sensors may include a vibration sensor, and the instructions may be configured to cause the remote computing device to receive vibration data from the vibration sensor, correlate the vibration data with the described steps, and include the correlated vibration data with the described steps in the digital recipe file. The sensors may also include a temperature sensor configured to measure an amount of heat applied to the heat transfer housing.

In an alternate embodiment, a system for aiding a cooking process includes a cooking device having a heat transfer housing configured to receive and hold a cookware item over a heating element of a cooking appliance. The cooking device also includes a force sensor configured to detect force data when the cookware item is positioned on the smart cooking device and when a cooking process occurs. A remote computing device is communicatively connected to the cooking device and contains programming instructions configured to cause the remote computing device to: receive the force data associated with the cooking process; receive temperature and time data associated with the cooking process; receive, via a user interface, user input that is descriptive of steps of the cooking process; correlate the force, temperature and time data with the described steps to generate a recipe associated for the cooking process; and create and store a digital recipe file of the recipe for the cooking process based upon the processed vibration, force, temperature and time data.

Optionally, the sensors may also include a vibration sensor, and the instructions may be configured to cause the remote computing device to receive vibration data from the vibration sensor, correlate the vibration data with the described steps, and include the correlated vibration data with the described steps in the digital recipe file.

Optionally, the remote computing device may also be configured to determine whether the cookware item is a known cookware item. If the cookware item is not a known cookware item, the system may use the smart cooking device to perform a calibration process for the cookware item.

The system also may include a camera positioned to capture an image of food placed in the cookware item, along with additional programming instructions configured to cause the remote computing device to determine whether the image corresponds to a known ingredient and correlate the image with the force, temperature and time data to identify an additional step or further describe one of the described steps of the recipe.

In any of the embodiments described above, the system also may include additional programming instructions that are configured to cause the remote computing device to receive a user selection of a digital recipe and play back the digital recipe by: outputting steps of the recipe via a user interface; receiving, from the force sensor and/or a vibration sensor of the cooking device, detected force or vibration data; and determining whether the detected force and/or vibration data corresponds to expected force or vibration data associated with a previously-output step of the recipe. If the detected force and/or vibration data does not correspond to the expected force and/or vibration data, the system may generate an audio and/or visual prompt to alert the user to take a cooking action associated with the previously-output step and the expected force data.

In any of the embodiments described above, the system also may include additional programming instructions that are configured to cause the remote computing device to receive a user selection of a digital recipe and play back the digital recipe by: outputting steps of the recipe via a user interface; receiving, from a temperature sensor of or proximate to the cooking device, detected temperature data; determining whether the detected temperature data corresponds to expected temperature data associated with a previously-output step of the recipe; and if the detected temperature data does not correspond to the expected temperature data, generating an audio and/or visual prompt to alert the user to adjust a temperature of the heating element.

In any of the embodiments described above, the remote computing device may include additional programming instructions that are configured to cause the remote computing device to receive a user selection of a digital recipe and play back the digital recipe by: using a user interface to output steps of the recipe; receiving one or more detected cooking parameters from one or more of the sensors; determining that the one or more detected cooking parameters do not correspond to an expected cooking parameter set associated with a previously-output step of the recipe; generating a prompt to alert the user to take an action associated with the previously-output step and the expected cooking parameter set; receiving, from the user, an override of the expected cooking parameter set, wherein the override includes an alternate cooking parameter; and saving a digital data file comprising a modified version of the recipe with the alternate cooking parameter.

In various embodiments, the smart cooking device may also include a power source operably connected to provide power to electrical components contained with heat transfer housing or the heat resistant housing. The system may also include a camera positioned to capture an image of food placed in the cookware item. The camera may be integral with the smart cooking device or part of a separate electronic device such as the remote computing device. The smart cooking device also may include a temperature regulating device positioned under the heat transfer housing and configured to regulate heat generated by the heating element via a valve that movably extends into and withdraws from the heating element.

DETAILED DESCRIPTION

Figure 1:
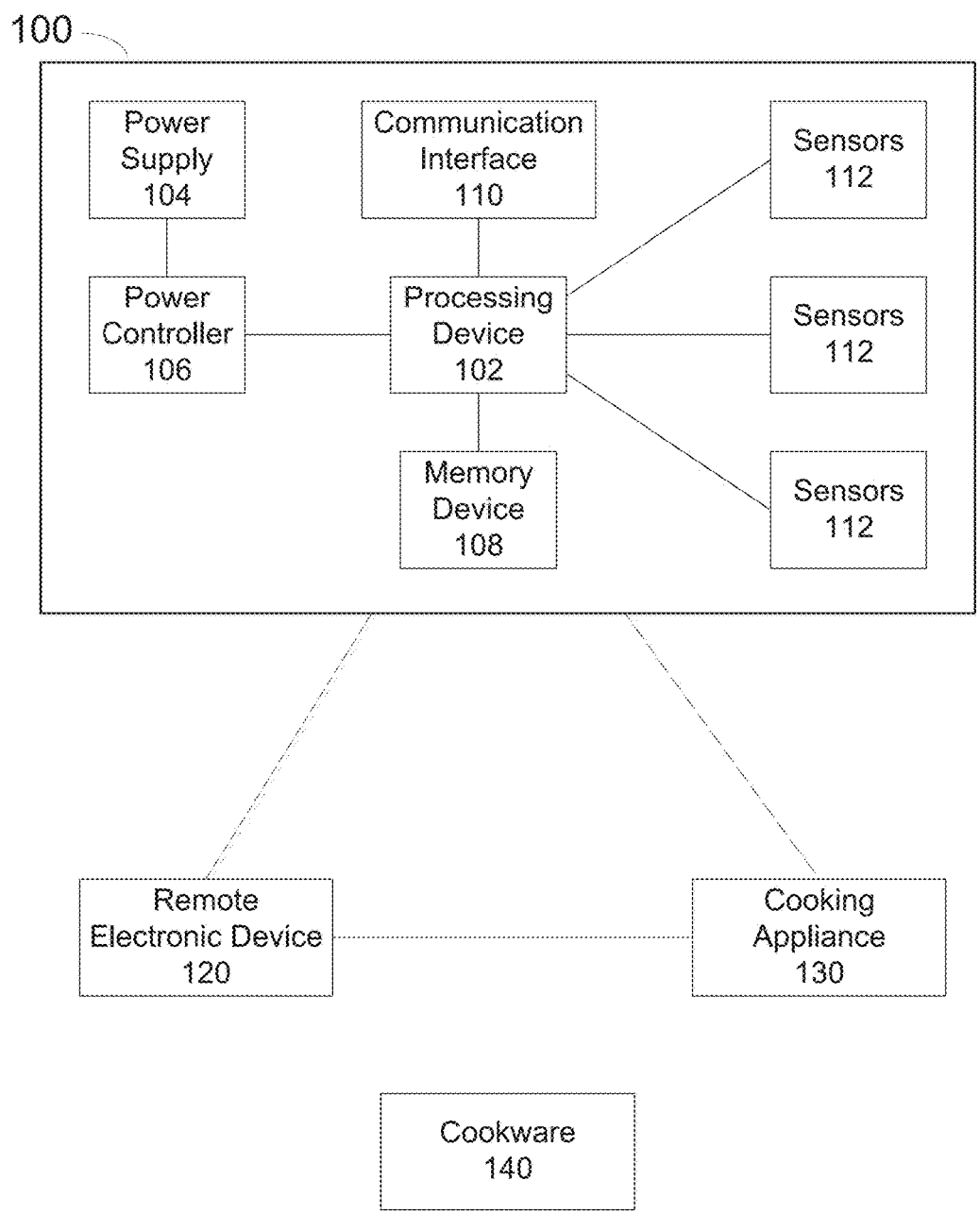
FIG. 1 depicts a circuit diagram for a sample smart cooking system according to an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used in this document, the terms "electronic device" and "computing device" refer to a device capable of receiving and processing one or more computer instructions to produce an output or other result. The electronic device includes a processing device and a non-transitory, computer-readable memory or storage device. The memory may contain programming instructions that, when executed by the processing device, cause the device to perform one or more operations according to the programming instructions.

As used in this document, a "remote computing device" refers to a computing device configured to be used in multiple diverse environments and typically includes a communications interface configured to connect to and communicate with a data communication network. For example, a remote computing device may be a smartphone or tablet computing device having one or more wireless communication interfaces configured to connect to various wireless networks including, but not limited to, cellular data networks, Wi-Fi networks, short range wireless communication networks such as Bluetooth, near field communication networks, and other similar wireless networks.

Cooking is a process that involves a number of measurable and quantifiable functions such as heat applied, time elapsed, weight or volume of items or ingredients added, and quantity of items being prepared. Currently, there is no way to automatically measure and digitally store this information in a way that will allow someone to recreate, modify, store and share their cooking instructions and recipes. Furthermore, following a recipe can be difficult, as a recipe does not capture all the subtle nuances of cooking. Rather, a recipe is generally written as a static listing of ingredients, cooking temperatures and cooking times, potentially including one or more illustrations or pictures, but does not provide a new, dynamic and engaging way to communicate cooking instruction. Additionally, as a recipe is generally a listing of generic ingredients (e.g., not brand or type specific), cooking a particular item or dish by following a recipe does not record or provide an indication of nutritional information associated with what is being cooked.

Cooking is also a very manual process. When preparing a meal at a standard cooking range, very little is automated other than temperature control (at, for example, an electric or induction range) or gas flow control (at, for example, a gas range). Rather, the person doing the cooking is generally required to perform all steps at the appropriate time during the cooking process, such as adding additional ingredients, altering the temperature, stirring or flipping one or more items being cooked, and other similar cooking activities.

The present disclosure is directed to a smart cooking device for use with a cooking appliance (e.g., a range, stove or grill), a cookware item (e.g., a pot, pan, griddle, or the like), and accompanying systems and software for tracking one or more cooking events that can occur during cooking of food. For example, the smart cooking device may monitor and measure the size and quantity of food being prepared, the duration of time that the food is cooked, the amount of heat and temperature applied to the smart cooking device as the food is being cooked, physical actions used during the preparation process (e.g., stirring or flipping), and other similar information related to the preparation process. The system may store this information as a digital recipe, and it may play back the recipe to guide a cook through a cooking process when the cook uses the recipe and the smart cooking device to cook food.

A sample smart cooking device may include, for example, a temperature measurement device for measuring heat output by a heat source and accompanying calibration software or information to determine how the output temperature by the heat source translates to cooking temperature at the smart cooking device. The smart cooking device may also include a temperature control apparatus for adjusting the output temperature that is passed from the cooking appliance (range, stove or grill) to the cookware, thereby altering the cooking temperature of the food that is in the cookware. Additionally, the smart cooking device may include multiple sensors configured to monitor and measure various forces such a pressure applied and vibrations resulting from agitation of the smart cooking device during, for example, flipping or stirring the food contained in the cookware as the cookware rests on the cooking device.

A system associated with the smart cooking device may include a computing device external to the smart cooking device and configured to store information received from the smart cooking device related to the preparation process. Such information may be used to produce a cooking activity recording that can be, for example, converted into a digital recipe file, stored for later access and/or playback, assigned feedback or other comments, shared with other users, converted to an electronic document (such as a PDF formatted document) for distribution via email or other electronic messaging service, shared via a social network, or distributed in other similar methods. Additionally, based upon the recipe and cooking activity information, nutritional and caloric information can be determined and recorded.

The system may also include functionality for providing one or more calibration processes. For example, the system may use the calibration functionality to normalize values relating to a cooking process such that a digital recipe or an existing cooking activity recording may be applicable to multiple users in varying cooking environments. More specifically, the system may calibrate a cooking process to account for the type of cooking utensil being used, adjusting for material type (including inherent properties associated with material type such as heat transfer properties), utensil weight, type of food product being used (e.g., what specific cut of meat is being cooked), and other similar factors that may cause a variance in cooking time or other related attributes for a particular recipe or cooking activity record.

FIG. 1 is a block diagram of various components of a smart cooking system that includes a smart cooking device 100. The smart cooking device 100 may include a processing device 102 configured to load and execute one or more operational instructions. Additionally, the smart cooking device 100 may include a power supply 104 such as a battery operably connected to a power controller 106. The power controller 106 may be operably connected to additional components within the smart cooking device 100 (e.g., to processing device 102 as shown in FIG. 1) and configured to distribute power from the power supply 104 to additional components within the smart cooking device. The power supply 104 may be, for example, one or more batteries and may be rechargeable or replaceable depending upon the design of the smart cooking device 100. Alternatively, if the smart cooking device 100 is integrated into a larger cooking appliance with a separate power supply (e.g., a range that is connected to a 120 or 240 volt power supply), the smart cooking device may draw power from that separate power supply.

Additionally, cooking device 100 may include, and the processing device 102 may be operably connected to, a memory device 108. The cooking device also may include a communication device 110, which is hardware (such as a transceiver with wireless antenna) for sending and/or receiving instructions or data from an external source. The memory device 108 may be configured to store instructions to be executed by the processing device as well as information related to and recorded about the food cooking or preparation process. The communication device 110 may include an input/output interface for operably connecting the smart cooking device 100 to a data communication network. For example, the communication device 110 may include a Wi-Fi adaptor for operably connecting to a Wi-Fi network. Similarly, the communication device 110 may include a short-range communication interface such as a Bluetooth® interface configured to operably connect to another computing device for data transmission.

The smart cooking device 100 may further include sensors 112 that are operably connected to the processing device 102. The sensors 112 may include, for example, one or more pressure sensors, vibration sensors, shock sensors, temperature sensors, and other similar sensors configured to measure and quantify one or more exterior forces applied to the smart cooking device 100. Optionally, any of the sensors 112 may include an image sensor (a camera) positioned to capture images of food positioned within cookware when the cookware is placed on top of the smart cooking device.

The smart cooking device 100 operates with a remote electronic device 120 and a cooking appliance 130. The remote electronic device 120 includes components such as those described below in the context of FIG. 14, and it is in electronic communication with the smart cooking device via a wireless communications protocol, such as Wi-Fi or near field communications. The cooking appliance 130 may or may not include various sensors and communications components. When the cooking appliance 130 has such components, it also may communicate with the smart cooking device 100 and/or the remote computing device by a wireless communications protocol. The cooking system also may include one or more items of cookware 140, which does not need to include sensors and communications components (although the present disclosure is not intended to exclude, and in fact does include, such smart cookware items in its scope). In operation, the cookware 140 will rest on the smart cooking device 100, which will in turn rest on the cooking appliance 130. The remote computing device 120 will be in a location that is consistent with a communication network via which the remote computing device 120 and the smart cooking device 100 may exchange data or commands.

Figure 2A:
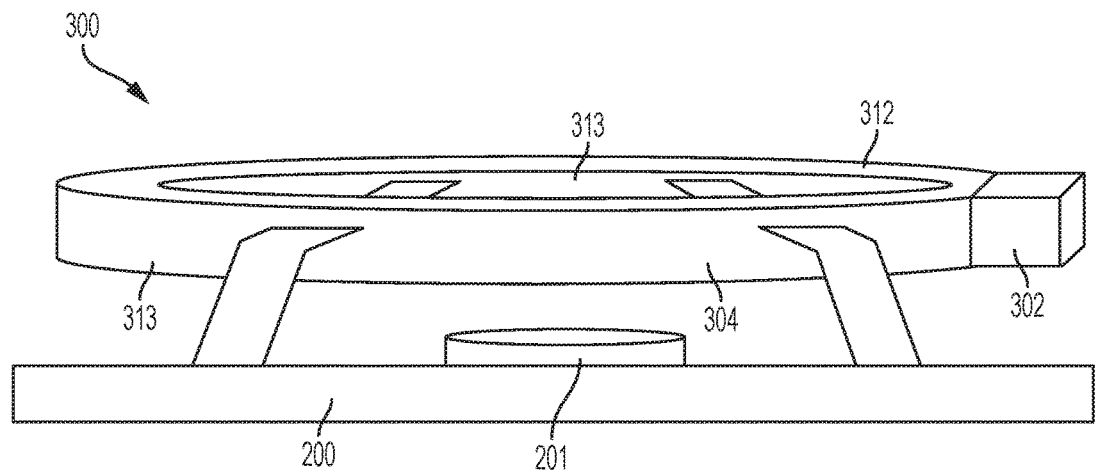
FIG. 2A depicts an example implementation of a smart cooking device for use in a smart cooking system according to an embodiment.
Figure 2B:
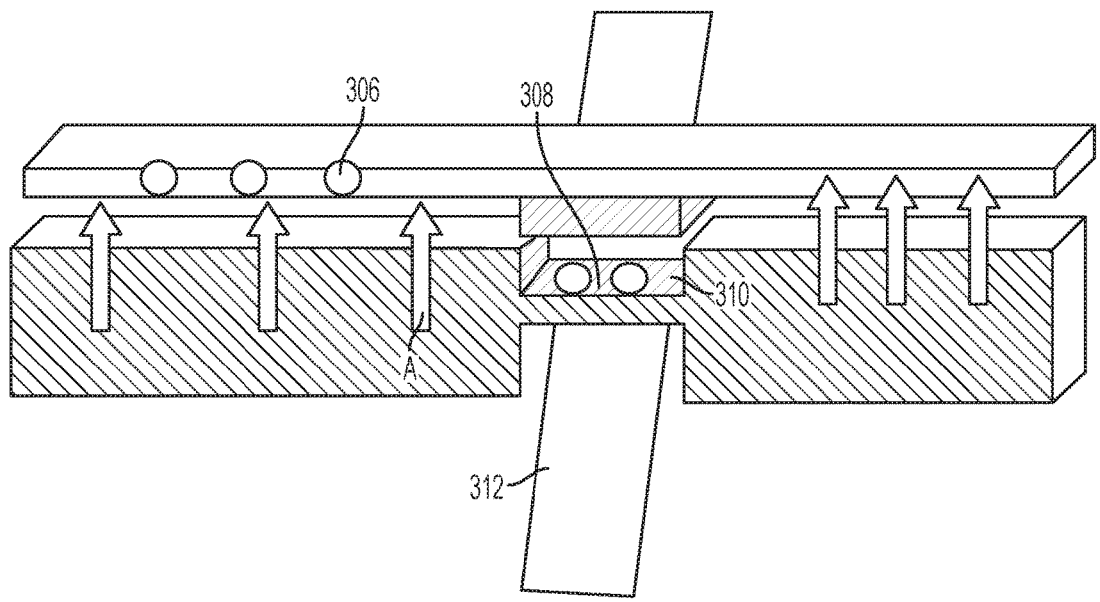
FIG. 2B depicts a cross-sectional view of the implementation of the smart cooking device as shown in FIG. 2A.

FIGS. 2A and 2B illustrate an example implementation of a smart cooking device such as smart cooking device 100 as described above in FIG. 1. As shown in FIG. 2A, the smart cooking device 300 includes a heat transfer housing 304 having a first (lower) face 311, and a second (upper) face 312. The first face 311 is sized and configured for placement on a burner 200 of, for example, a gas range. Elements of the burner 200 may snugly fit into the heat transfer housing 304 as shown, or the heat transfer housing 304 may simply sit on top of a burner cover over the range's burner 201. The smart cooking device 300 may thus be integrated into a pot or pan for placement onto the burner. The second face 312 of the heat transfer housing 304 is positioned and configured to receive and hold a cookware item such as a pot or pan. Optionally, the first face 311 may be indented or angled inward to receive and hold a pot, pan or other cookware item.

The heat transfer housing 304 may optionally be circular as shown, with a central opening 313 positioned to pass heat from the burner 202 directly to the cookware item. If the housing 304 includes an opening as shown, then the heat transfer housing 304 may be made of any durable material that can withstand heat from the burner, such as cast iron, aluminum, steel or other material. Examples include a material with magnetic properties such as cast iron, or ferritic (or other magnetic forms of) stainless steel.

An electronics enclosure 302 may be attached to the heat transfer housing 304 and be configured to house various electronic components that should not be exposed to direct heat. For example, the electronics enclosure 302 may house a processing device, any memory and communication devices, and the power supply and controller. The electronics enclosure 302 will include an insulating material that protects the electrical components. In some embodiments, the electronics enclosure 302 may include one or more indicator lights that, when actuated by internal circuitry, turn on or off based on commands from a remote device, to indicate a power on/off status, or based on values of sensed data exceeding or dropping below certain thresholds. In addition, the electronics enclosure 302 may include any or all of the elements of the remote computing device that is described in various parts of this disclosure, and such embodiments may operate as a stand-alone unit.

The heat transfer housing 304 may house or hold various internal or external sensors. For example, as shown in FIG. 2B, sensors 306, 308 may be integrated into the heat transfer housing 304 to measure activity and forces directly related to the operation of the smart cooking device. For example, a set of temperature sensors 306 may be positioned such that they can accurately measure the output temperature of the gas range as indicated by arrows A. Similarly, force sensors 308 may be positioned such that any force applied to the smart cooking device 300 from the cookware (i.e., forces transferred from a frying pan or other cookware item placed on the burner) can be measured. Examples of suitable force sensors 308 include hydraulic, pneumatic, piezoelectric and capacitive load cells, as well as strain-gage-based load cells. The sensors 306, 308 may be operably connected to one or more of the communications components that are housed within electronics enclosure 302 such that values measured by the sensors can be transmitted by to those components to external devices The sensors in or connected to the housing also may include one or more vibration sensors, such as accelerometers or transducers that detect movement of the housing, such as movement caused by stirring, filling, or otherwise moving food within a cookware item that is placed on top of the device 300.

As the smart cooking device 300 may be configured to be placed directly on the burner, e.g., on burner leg 312 as shown in FIG. 2B. If so, one or more of the force sensors 308 may be insulated from the heat of the range. To provide insulation, an insulating material 310 may be placed around the force sensors 308 to provide for insulation from the heat produced by the range. The amount of and type of insulation may vary based upon, for example, the heat tolerance of the force sensors as well as the level of heat to which the smart cooking device 300 is expected to be exposed.

Figure 2C:
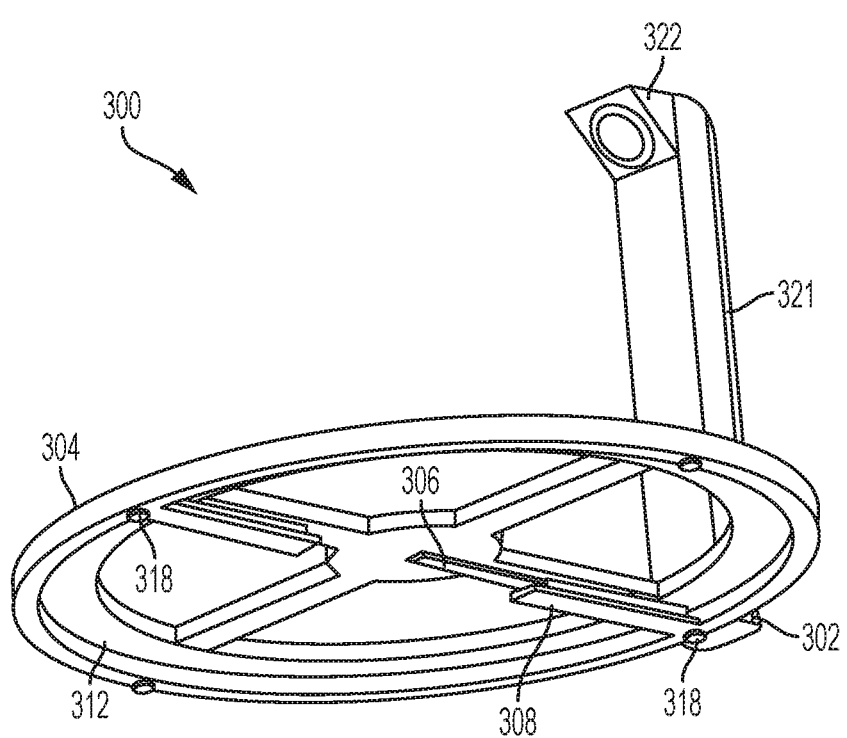
FIGS. 2C-2E depict additional views of the smart cooking device of FIG. 2A with various optional additional components added.

FIG. 2C illustrates an underside view of the smart cooking device 300, in this case with a camera 322 attached to the heat transfer housing 304 and positioned to capture images of food and cooking actions within cookware when the cookware is placed on top of the housing. The camera 322 may be directly or indirectly attached to the housing via a support arm 321. The support arm may comprise an insulating material, and it may also include or be connected to the electronics enclosure 302. In addition or alternatively, the system may include a camera that is part of a separate, remote computing device such as a smartphone, tablet computing device or digital camera.

The force sensor(s) 308 may be positioned proximate to the lower face 312 of the device so that they are pressed against the burner cover of the appliance in operation. The temperature sensor(s) 306 also may be may be positioned proximate to the lower face 312 of the device so that they are positioned near the heating element of the appliance in operation. Optionally, the heat transfer housing 304 may extend below the second face 312 as shown in FIG. 2C so that a cavity or ledge is created to hold various sensors. Optionally, the second face 312 may include one or more resilient elements (e.g., springs or spring-based pins 318) that extend from the housing, so that when force is applied to the top of the housing, the resilient element will laterally interact with the appliance top (e.g., the burner cover) and help hold the device in place.

Figure 2D:
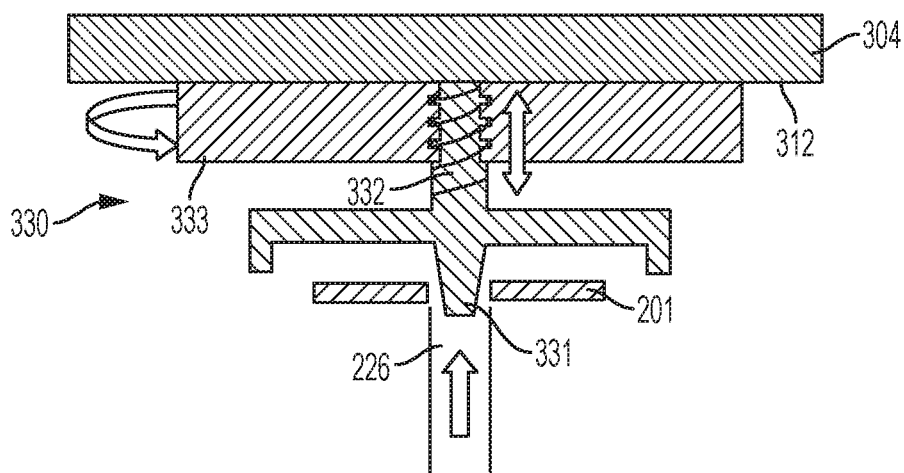
Figure 3:
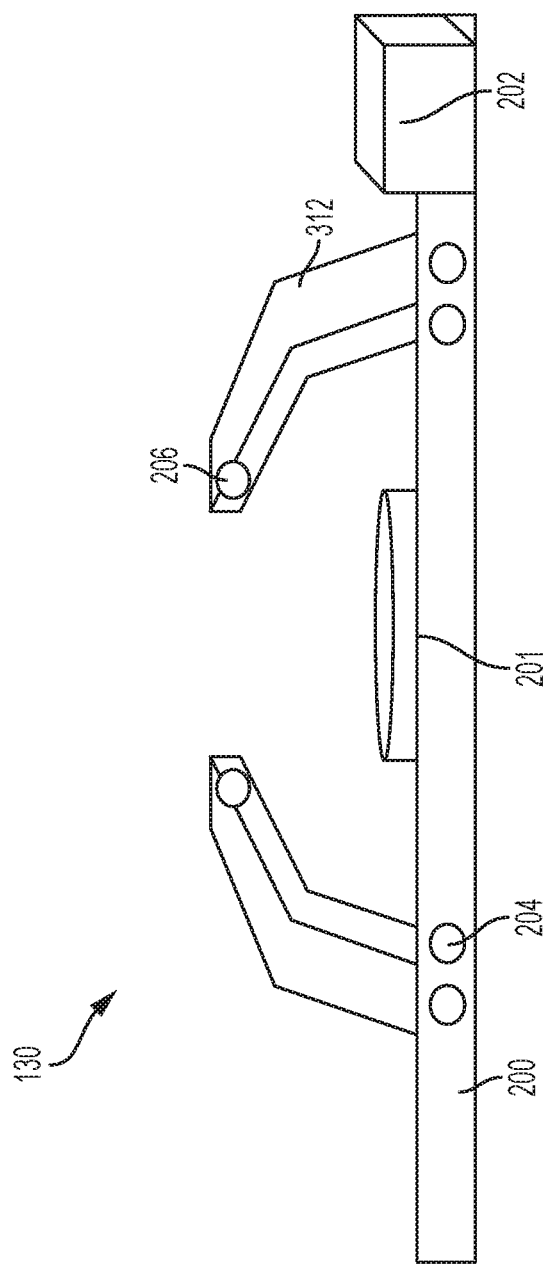
FIG. 3 depicts an example of a part of a cooking appliance, in this case a burner of a gas range, that may work with the system according to an embodiment

FIG. 2D illustrates that in some embodiments, the heat transfer housing 304 of the smart cooking device may include a temperature regulating device 330 positioned under the (lower) face 312 to regulate the heat that passes from the heating element 201 of a cooking appliance to the heat transfer housing. For example, as shown in FIG. 3 the temperature regulating device may include a support element 333 that is attached to the heat transfer housing 304 and that includes a threaded opening that holds a screw valve 331 having a tapered tip. The screw valve may include a first end with threads 332 that movably hold the valve 331 in the support element 333. When the valve 331 is turned in a clockwise or counterclockwise direction, the tapered tip will move up (away from) or down (into) an opening of the heating element 201 to reduce or increase the flow of gas 226 to the heating element and thus regulate the heat generated by the heating element. Optionally, the screw valve may be connected to a motor that automatically turns the support element 330 or the valve 331 so that the tapered tip of the valve 331 is moved in response to actuation of the motor as commanded by a remote electronic device. The temperature regulating device 330 may be removably attached to the heat transfer housing by one or more fasteners such as threads, clips, hooks, tongue-and-groove structures, or other removable fastening structures.

Figure 2E:
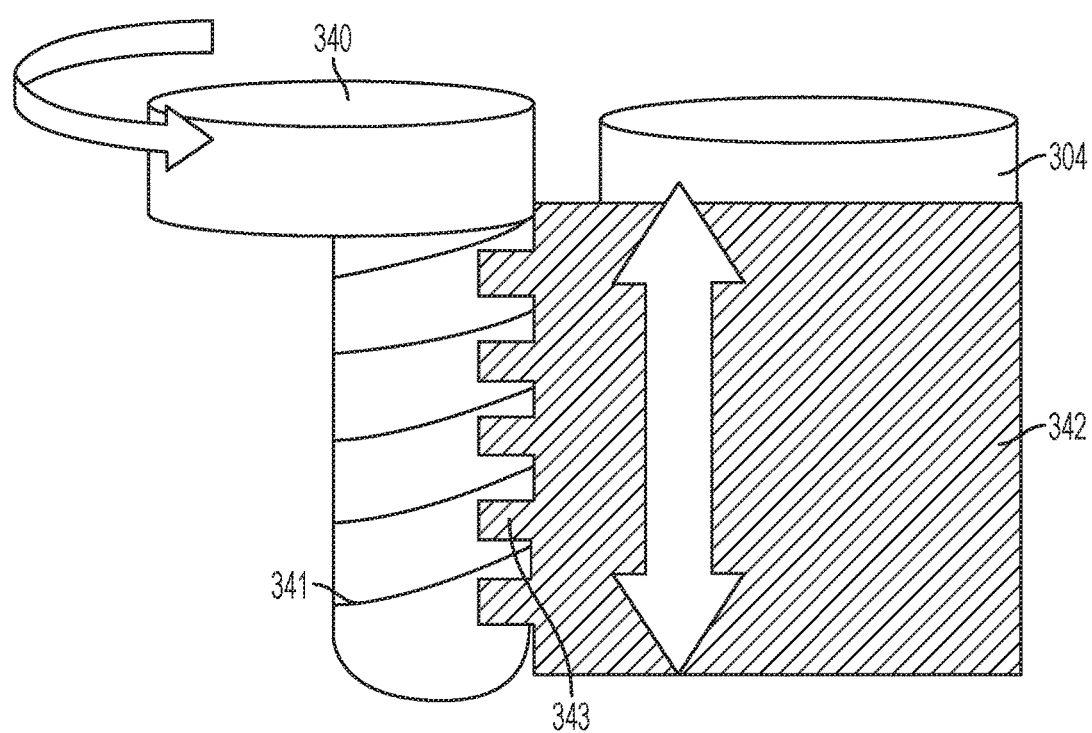

FIG. 2E illustrates that the cooking device also may be equipped with a motor housing 340 that holds a bidirectional motor that is connected to, and operates to turn, a first gear 314. A second gear 342 will be connected to the heat transfer housing 304. Optionally, the motor housing 340 may be connected to or integral with the electronics housing 302 (of FIG. 2A). The teeth of the first gear and the second gear will interact so that when the first gear 341 is turned in a first direction (e.g., clockwise), the heat transfer housing 304 will be moved upward and away from the heating element. When the first gear 341 is turned in the opposite direction (e.g., counterclockwise), the heat transfer housing 304 will be moved down and toward the heating element.

In some embodiments, the second (lower) face 312 also may include a rotational element such as a turntable that may similarly be motor-operated and remotely controlled to allow rotation of the cooking device (and thus also the cookware that is placed on the device).

The sensors of device 300 may work in conjunction with sensors contained in other elements of the system. For example, as shown in FIG. 3, a heating element 201 of a cooking appliance 130 may include a burner with one or burner cover structures such as, for example, the legs 312 of a gas range as shown. An enclosure 202 may be configured to house various components that should not be exposed to direct heat, such as a processing device, any memory and communication devices, a power supply and/or controller.

The sensors 204, 206 may be integrated into the legs of the burner 200 themselves to measure activity and forces directly related to the operation of the appliance. For example, a set of temperature sensors 204 may be positioned such that they can accurately measure the output temperature of the gas range. Similarly, force sensors 206 may be positioned such that any force applied to the burner cover (i.e., forces transferred from a frying pan or other cooking device placed on the burner) can be measured. The sensors 204, 206 may be operably connected to one or more components housed within enclosure 202 such that values measured by the sensors can be transmitted to those components.

It should be noted that the hardware components and implementation examples as shown in FIGS. 1 through 3 are shown by way of example only. Depending upon the design and implementation of the smart cooking device, the techniques and processes as described in this document may be applied to a variety of embodiments not illustrated in this document.

Figure 4:
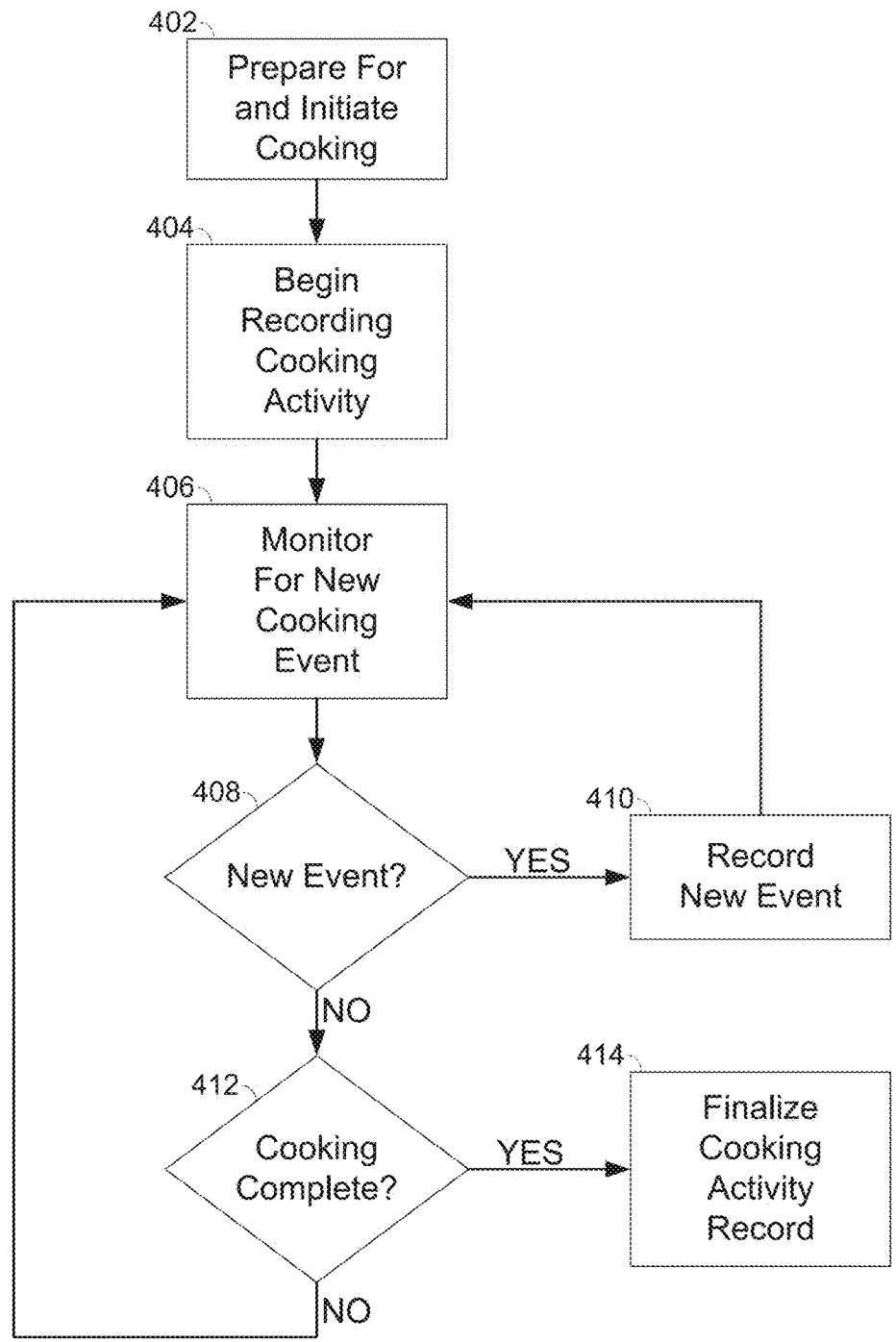
FIG. 4 depicts a flow diagram illustrating a sample method for recording cooking activity using a smart cooking system according to an embodiment.

FIG. 4 illustrates a sample process for recording cooking activity using a smart cooking system including a smart cooking device such as those described above. During this process, depending upon the configuration of the smart cooking device and whether the smart cooking device is in communication with a remote computing device during the cooking process, alternative devices may perform various steps as shown in FIG. 4. However, FIG. 4 is provided by way of example to illustrate a sample recording process for a particular cooking process using a smart cooking device such as that taught herein.

Initially, the system may prepare 402 for and initiate a cooking process. For example, the smart cooking device may be powered on and operably (i.e., via a communication link) connected the smart cooking device to a remote computing device (e.g., via an automatic Wi-Fi or Bluetooth connection initiated by turning on the smart cooking device). A corresponding application may be launched on the remote computing device, e.g., an application provided by the manufacturer of the smart cooking device for use in concert with the smart cooking device. The smart cooking device will be placed over a heating element of a cooking appliance, and a cookware item will be placed on the upper face of the smart cooking device. A user may then begin the cooking activity. For example, the user may turn the cooking appliance up to an appropriate temperature and add the initial ingredients to the cookware. The sensors of the smart cooking device may detect the force of the cookware and the food, the vibrations of items being added to or stirred within the cookware, and/or the temperature generated by the burner. The smart cooking device may transmit this sensed data to the remote computing device, which may begin 404 recording the cooking activity. For example, the remote computing device may record 404 the initial time when the cooking process started, the initial temperature settings, and any initial activities such as one or more food items being added to the cookware.

Additionally, or optionally, the remote computing device may also initiate a calibration process for the smart cooking device in advance of or during the initiation of a particular cooking process. The calibration process may account for the type of cookware being used, including receiving the cookware, measuring the weight, and automatically storing the weight in the memory. Then, during use, the application on the remote computing device may adjust sensed weight by subtracting the stored weight of the cookware to determine the weight of the food. The application also may store and material used in the manufacture of the cookware. This calibration may provide a more accurate measurement of surface temperature as well as weight of product being added to the cookware as the initial or empty weight of the cookware would be known and accounted for.

Similarly, a more advanced calibration process may be used the first time a particular cookware item is used. For example, a user may add a temperature sensor of a known weight to the cookware and cycle the system through a heating and cooling process. Additionally, a user could cycle through a time/gas pressure sequence to standardize gas pressure and resulting applied heat for the set of cookware items. Such a process could allow for standardization of surface temperatures for a set of cookware items as well as identify any unique characteristics for a particular cookware item the first time that the cookware is used. However, it should be noted that the calibration process and techniques as described in this document are provided by way of example only, and may be adjusted or expanded depending upon the implementation of the smart cooking device.

The remote computing device may create a profile for each cookware item that includes the weight of the cookware item and/or other data sensed during the calibration process, and it may store the profile data in a memory. Then, when the smart cooking device is used with that cookware item again, the system may access the cookware profile when recording new data. The system may identify the cookware item based on user input, based on using near-field or short range communication to detect a tag or token of the cookware item and finding a profile with an identifier corresponding to the tag or token, by scanning a barcode on the cookware item and finding a profile with a code corresponding to some or all of the barcode, by taking a photograph of the cookware item and using image processing to find a profile having an image that corresponds to the captured image, or by other methods. Alternatively or in addition, the force sensors of the smart cooking device may detect the weight of the cookware and use the weight to find a profiled cookware item with a matching weight in its profile.

Referring again to FIG. 4, throughout the cooking process, the remote computing device may monitor 406 the sensed data to detect when a new cooking event occurs. A new cooking event may be identified, for example, if the sensed temperature changes more than a threshold amount, the force or vibration sensors detect at least a threshold amount of force or movement, by a camera of the smart cooking device or of the remote computing device capturing a sequence of images that shows movement within the cookware, or by other methods. These situations may occur if there is a change of the temperature of the smart cooking device, if a cook adds a new ingredient to the cookware, or if the cook performs a physical activity such as stirring or flipping food within the cookware, based on detection of other activities common to the cooking process. If the remote computing device determines 408 that a new event has occurred, the remote computing device may record 410 that new event (including an indication of what type of activity occurred and an associated time stamp as detected by a clock device, or a clock application of the computing device), and then continue to monitor 406 the data for new cooking events. If the remote computing device does not determine 408 that there is a new cooking event (e.g., if it does not record a new event for a specific time period), the remote computing device may determine 412 whether the cooking is complete. For example, the remote computing device may determine 412 whether the appliance has been turned off (based on sensed temperature dropping below a threshold), whether all food products previously contained within the smart cooking device have been removed (based on a reduction in force applied to the device), whether the heat source associated with the appliance has been shut off, or it may assess other data to determine if the cooking process has completed. Alternatively or additionally, the remote computing device may prompt the user to confirm that the cooking process is complete.

If the remote computing device does determine 412 that the cooking process has completed, the remote computing device may finalize 414 the cooking activity record, and it may record any final details related to the events that occurred during the cooking activity as a digital recipe file. Example data may include weights of ingredients, vibration and force data detected and associated times, and temperatures sensed and associated times. If, conversely, the remote computing device does not determine 412 that the cooking process is complete, the remote computing device may continue to monitor 406 the sensed data for new cooking events.

It should be noted that the process as illustrated in FIG. 4 and described in this document is provided by way of example only. Additional process steps may be included depending upon the implementation of the smart cooking device and the associated software. Similarly, the process steps as shown in FIG. 4 may be performed in an alternative order, or steps may be performed simultaneously, depending upon the implementation of the smart cooking device and the associated software. Additional playback steps will be discussed below in the context of FIGS. 12A-B.

Figure 5:
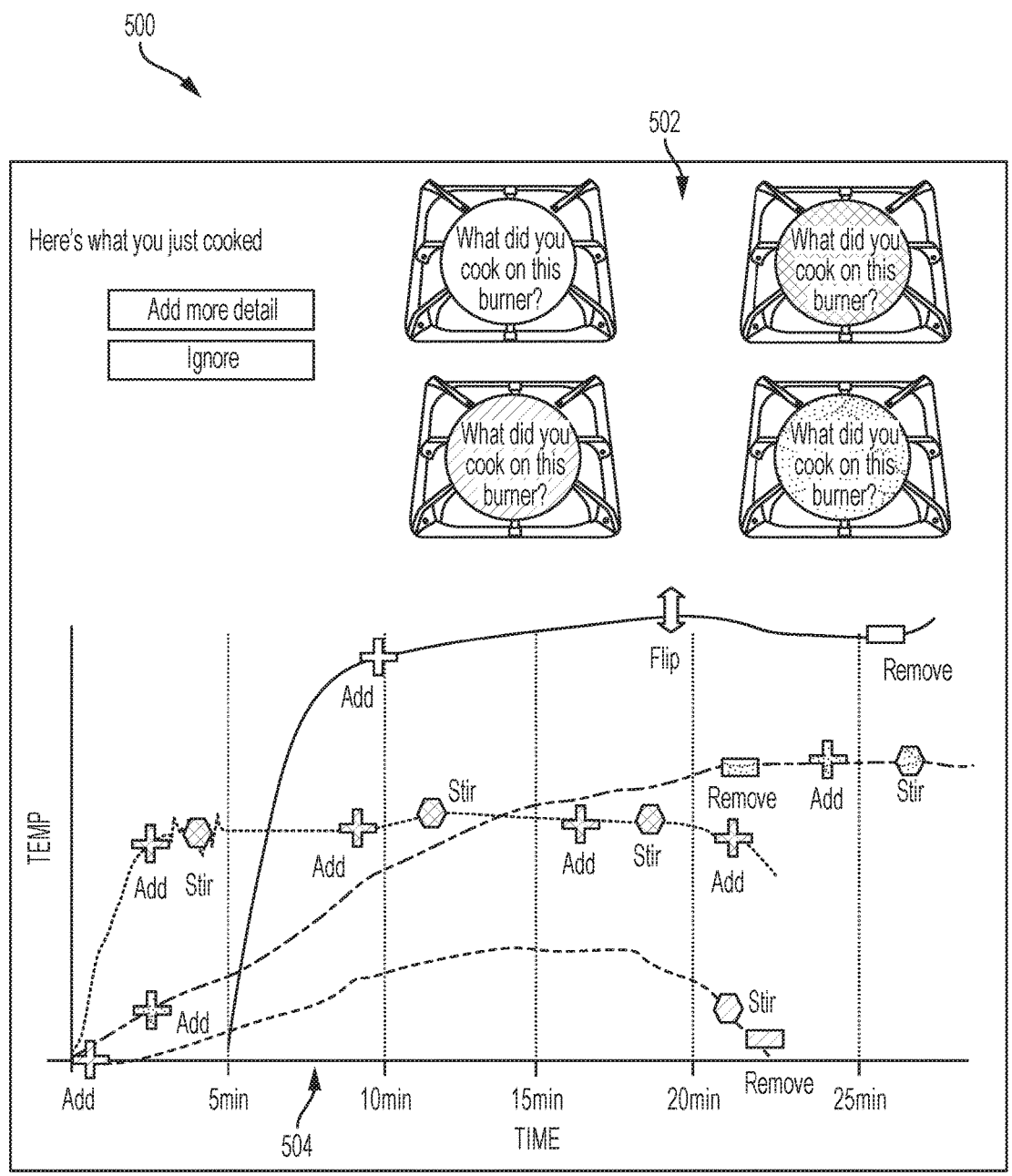
FIG. 5 depicts a view of a sample screenshot of a user interface for interacting with recorded data related to the smart cooking system according to an embodiment.

FIG. 5 illustrates a screenshot of a sample user interface 500 that a user may access on, for example, the remote computing device that is, or was, operably connected to the smart cooking device either during the cooking process or after the cooking process such that information related to the cooking process has been uploaded thereto. The user interface 500 may include several user-accessible areas into which the user can add additional information related to the recorded cooking activity record associated with the user's cooking process, such as sectors of a touch-sensitive screen, with icons corresponding to the burners of the appliance, or of multiple connected smart cooking devices, or the like. Similarly, the user interface 500 may include one or more areas where information specific to the cooking process is displayed. For example, the user may be able to enter additional information related to the cooking process in user-accessible area 502. In this example, the area 502 depicts four separate burners, however this configuration is shown by way of example only. In alternative embodiments, the graphical depiction in area 502 may be customized based upon the type of smart device used during the cooking process. In this example, the user may access area 502 to specify what type of food was cooked on each of the four burners. Similarly, an information display area 504 may be related to recorded cooking activity for each of those four burners as identified in area 502, including specific activities such as adding an ingredient or stirring, as well as how the temperature changes over time for that specific burner. It should also be noted that the information displayed in the information display area 504 is provided by way of example only, and would vary based upon what type of smart cooking device was used and what events occurred during the cooking process.

Figure 6:
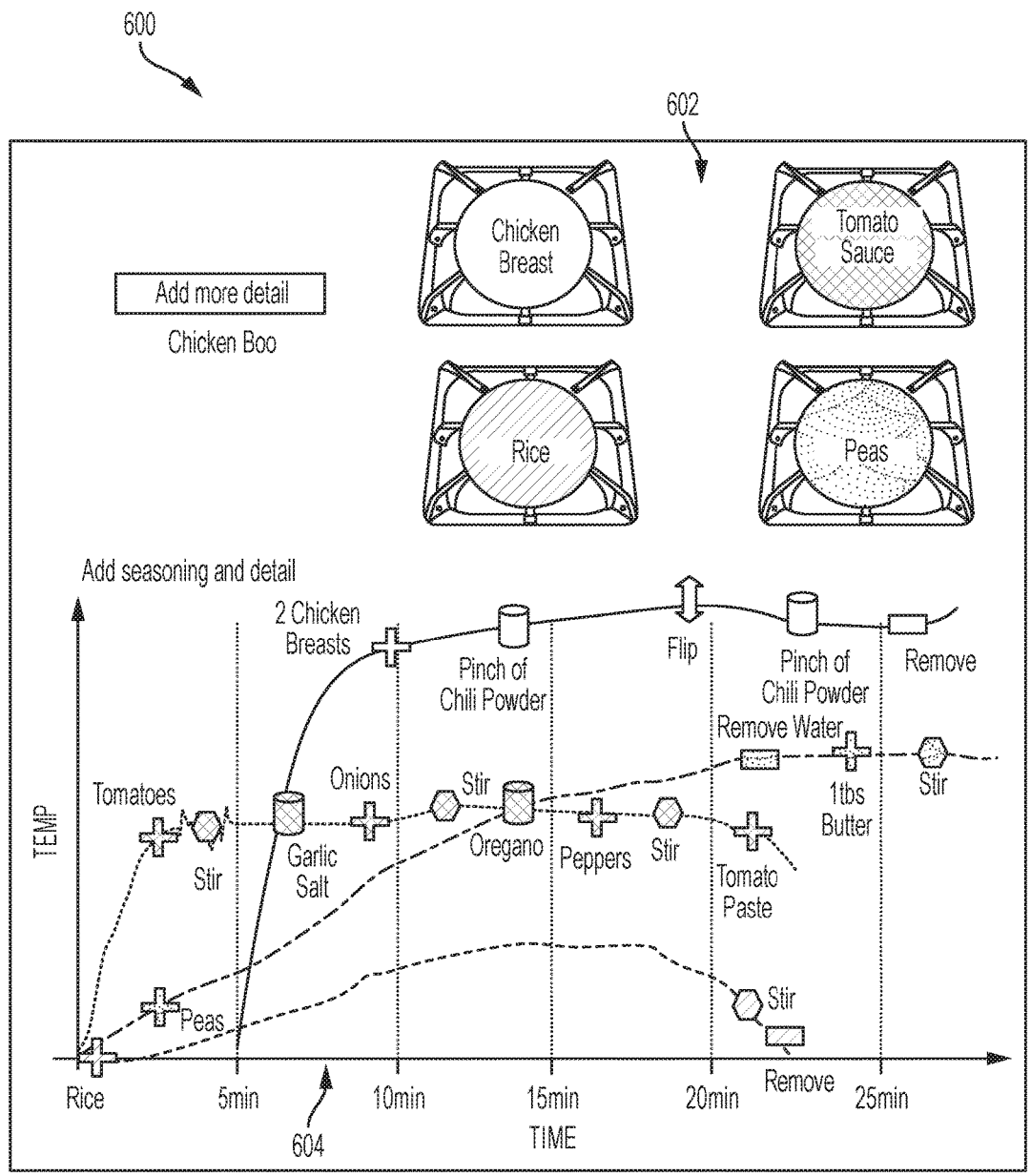
FIG. 6 depicts a view of another sample screenshot of a user interface for interacting with recorded data related to the smart cooking system according to an embodiment.

FIG. 6 illustrates a screenshot of a sample user interface 600 that includes information related to the cooking process. Some data may be entered by a user or captured using image recognition of items within the cookware. For example, the user interface 600 may display specific information in area 602 related to what was prepared on each burner. Similarly, the user interface 600 may display a combination of user-entered and sensed information related to one or more events that occurred during the cooking process in information display area 604, such as what type of food or ingredient was added, at what time, and how much by weight (including, for example, a specific type or cut of meat), what physical actions did the user perform during the cooking process, and at what temperature did those actions occur.

Figure 7:
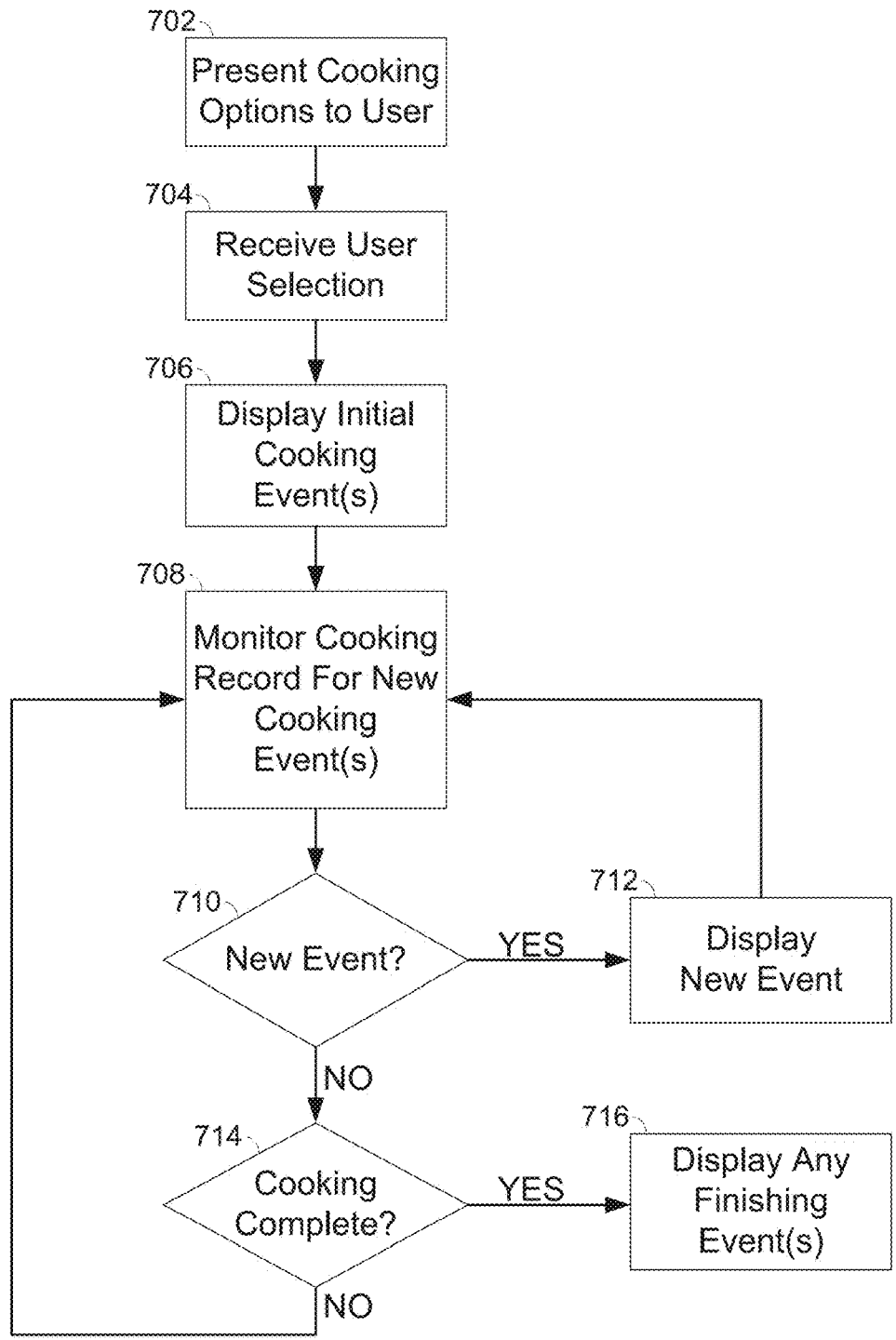
FIG. 7 depicts a flow diagram illustrating a sample method for playing back a recipe and using the smart cooking system to implement the recipe according to an embodiment.

FIG. 7 illustrates a sample process for playing back a recorded cooking activity on, for example, a remote computing device. The remote computing device may present 702 one or more cooking options to a user. For example, the remote computing device may present 702 a listing of all available cooking activity records (i.e., digital recipes) for the user to choose from. This list may include records created personally by the user, records received by the user from a friend or other acquaintance, records downloaded or purchased by the user (e.g., from a celebrity's website), or records obtained from other similar sources. The remote computing device may receive 704 the user's selection for a specific record to display, and the remote computing device may display 706 the initial cooking events for the record such as initial temperature, initial food quantities and other similar information.

If the user selects a digital recipe and plays it on the remote computing device, the device may work with the smart cooking device to monitor 708 the cooking activity to determine whether it is consistent with the recipe. For example, if the remote computing device determines 710 that a new event has occurred in the cooking activity record, the remote computing device may display 712 the data recorded about the new cooking event. For example, the remote computing device may update a displayed overview of the cooking activity record and/or produce an outputted sound or video display associated with the new cooking event. If the new data differs from any existing data by more than a threshold amount, the remote device may alert the user of the discrepancy. In embodiments where the smart cooking device or appliance is capable of receiving commands and acting on them, the smart cooking device or the appliance may receive commands from the remote computing device and act on those commands. For example, if the smart cooking device or remote computing device senses that the temperature is below a threshold, the remote computing device may command the appliance to increase the intensity of the burner, or it may instruct the smart cooking device to open a lower door of its housing to allow more heat to pass. The remote computing device may then continue to monitor 708 the cooking activity record for another cooking event.

If, conversely, the remote computing device not determine 710 a new cooking event, the remote computing device may determine 714 whether the cooking is complete. If the remote computing device does determine 714 that the cooking is complete (e.g., that there are no remaining cooking events), the remote computing device may display any finishing events associated with the cooking activity recording such as serving suggestions, finishing garnishes, and other similar finishing activities associated with meal preparation. If, however, the remote computing does determine 714 there are additional cooking events and the cooking process is not complete, the remote computing device may continue to monitor 708 the cooking activity record for additional cooking events.

It should be noted that the process as illustrated in FIG. 7 and described herein is provided by way of example only. Additional process steps may be included depending upon the implementation of the smart cooking device and the associated software as described here. Similarly, the process steps as shown in FIG. 7 may be performed in an alternative order, or steps may be performed simultaneously, depending upon the implementation of the smart cooking device and the associated software. Additional playback steps will be discussed below in the context of FIGS. 13A-B.

Figure 8:
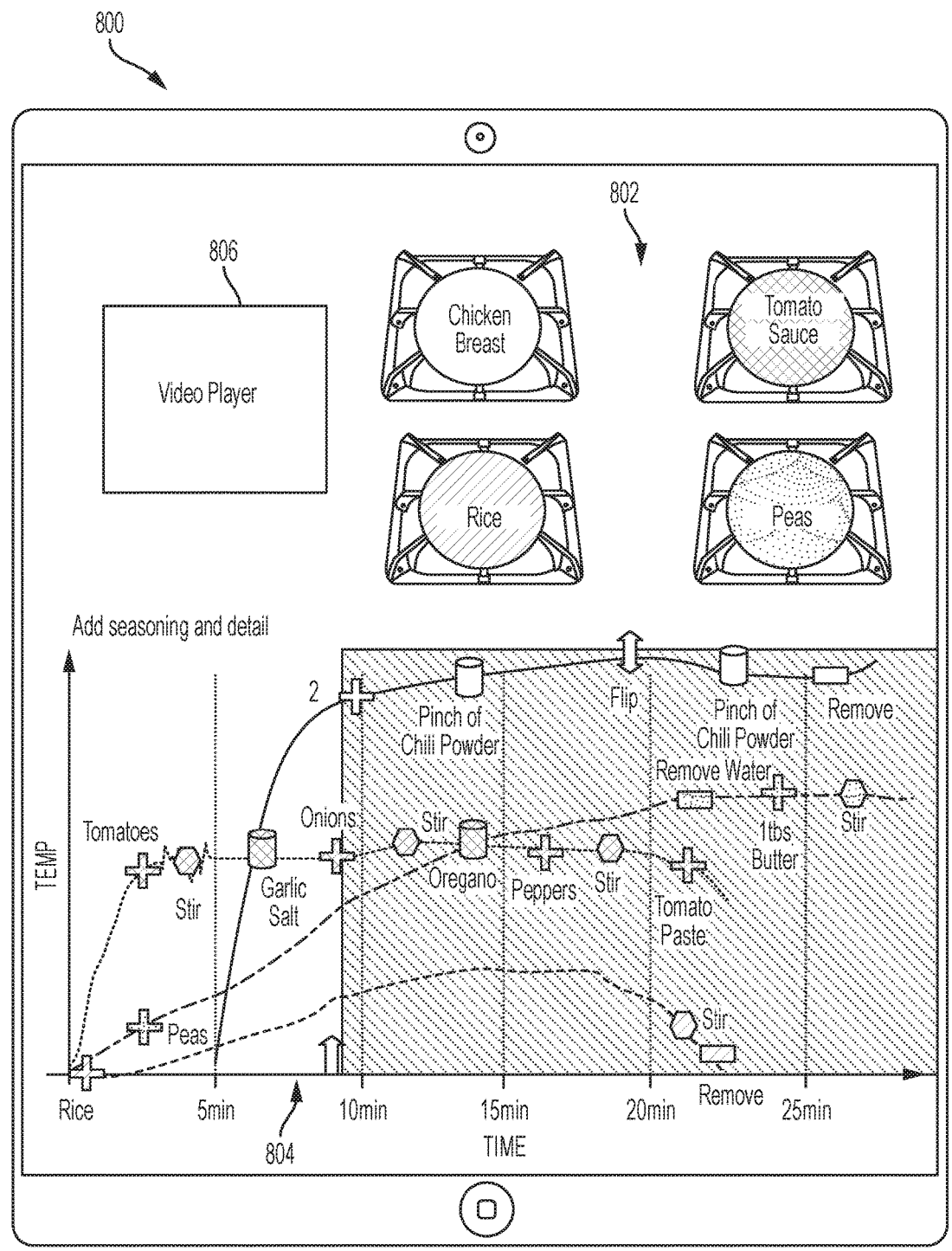
FIG. 8 depicts a view of another sample screenshot of a user interface for playing back a cooking activity recording according to an embodiment.

FIG. 8 illustrates a screenshot of a sample user interface 800 that may be displayed during playback of a cooking activity record. The user interface 800 may include an area 802 specific to the smart cooking device being used, and what products or ingredients are to be prepared using the smart cooking device. For example, as shown in FIG. 8, the smart cooking device may include four burners, each of which is intended for preparing a specific component of a meal.

Additionally, the user interface 800 may include a time-graph 804 that shows a temperature range and listing of specific cooking events for each component of the meal. The time-graph 804 may also have a timing indicator (shown in FIG. 8, for example, as an arrow and a shaded area) for illustrating at what point in the record the user is at. Similarly, a video player 806 may be provided and synchronized with the timing indicator, the video player configured to display a video of, for example, a celebrity chef (if such a video is available) preparing the same meal. Alternatively, the video player 806 may include stock footage related to an upcoming event, such as a short clip of a person flipping a piece of chicken or stirring a pot of sauce.

The application associated with the cooking device as described herein may also be associated with a subscription service or another similar source of additional information. For example, based upon a user's subscription level, the user may be able to access more detailed cooking activity recording including, as described above, videos of celebrity chefs preparing the same meals that the user can follow along in the application.

Figure 9A:
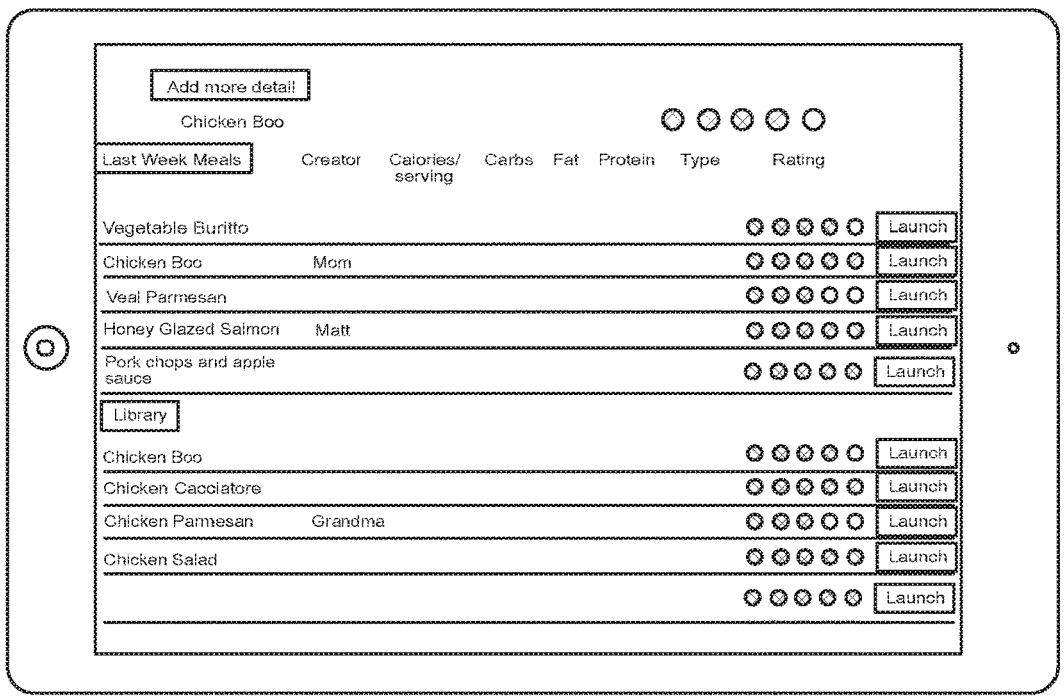
FIGS. 9A and 9B depict sample screenshots of an information indexing user interface according to an embodiment.
Figure 9B:
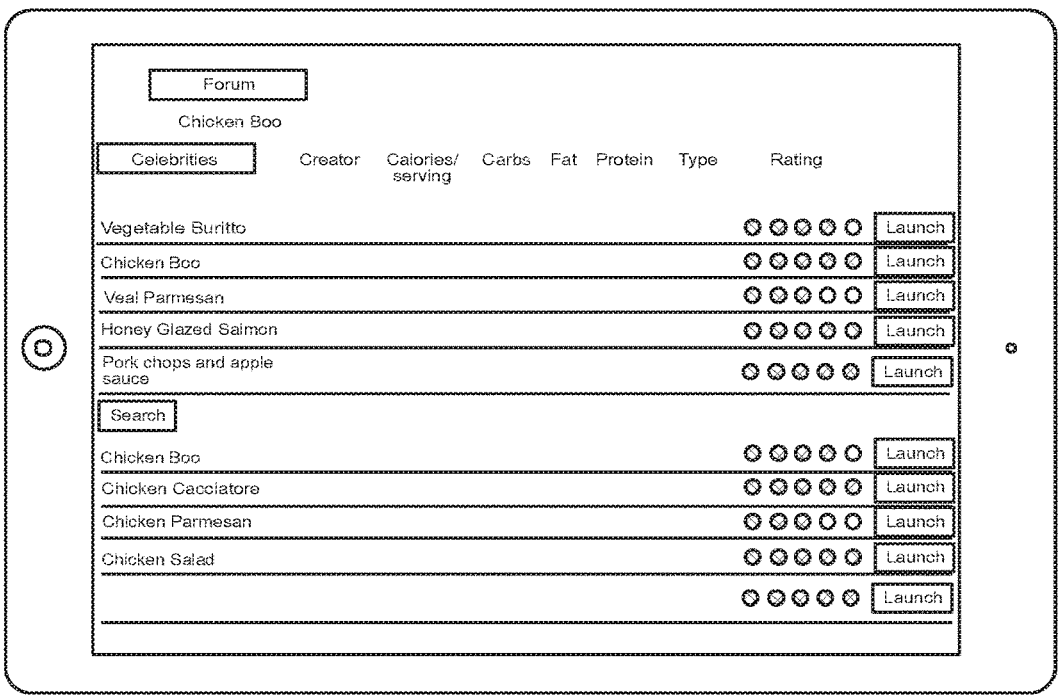

FIGS. 9A and 9B illustrate sample listings of an index of available cooking activity records. For example, FIG. 9A illustrates an index listing of user-created records. The index may include various information related to each record such as creator, calories per serving, additional nutritional information, protein type and overall rating. The index may also include an option to launch the cooking activity record in the playback interface. Similarly, FIG. 9B includes a view of a user forum including cooking activity records that may be provided by, for example, a celebrity chef. Similar options in this forum include the function to launch the cooking activity record in a playback interface such as that shown in FIG. 8.

Figure 10:
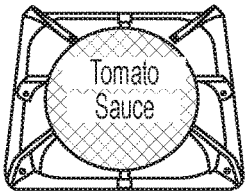
FIG. 10 depicts a sample screenshot of a feedback interface according to an embodiment.

FIG. 10 illustrates a sample feedback interface for a cooking activity recording. For example, the user has the option to rank a meal, provided detailed feedback related to specific components of the meal (e.g., that the tomato sauce needed more salt as shown in FIG. 10), as well as a grading of each component of the meal that can be averaged into an overall score for the meal. Such an overall ranking and score for the meal can be used to sort the cooking activity record in the indexing screen. Additionally, the feedback for a specific meal can be updated in response to changes to a cooking activity record in an effort to improve the overall taste and quality of a specific meal. Such changes may be recorded and associated with an updated version of the cooking activity recording.

Figure 11:
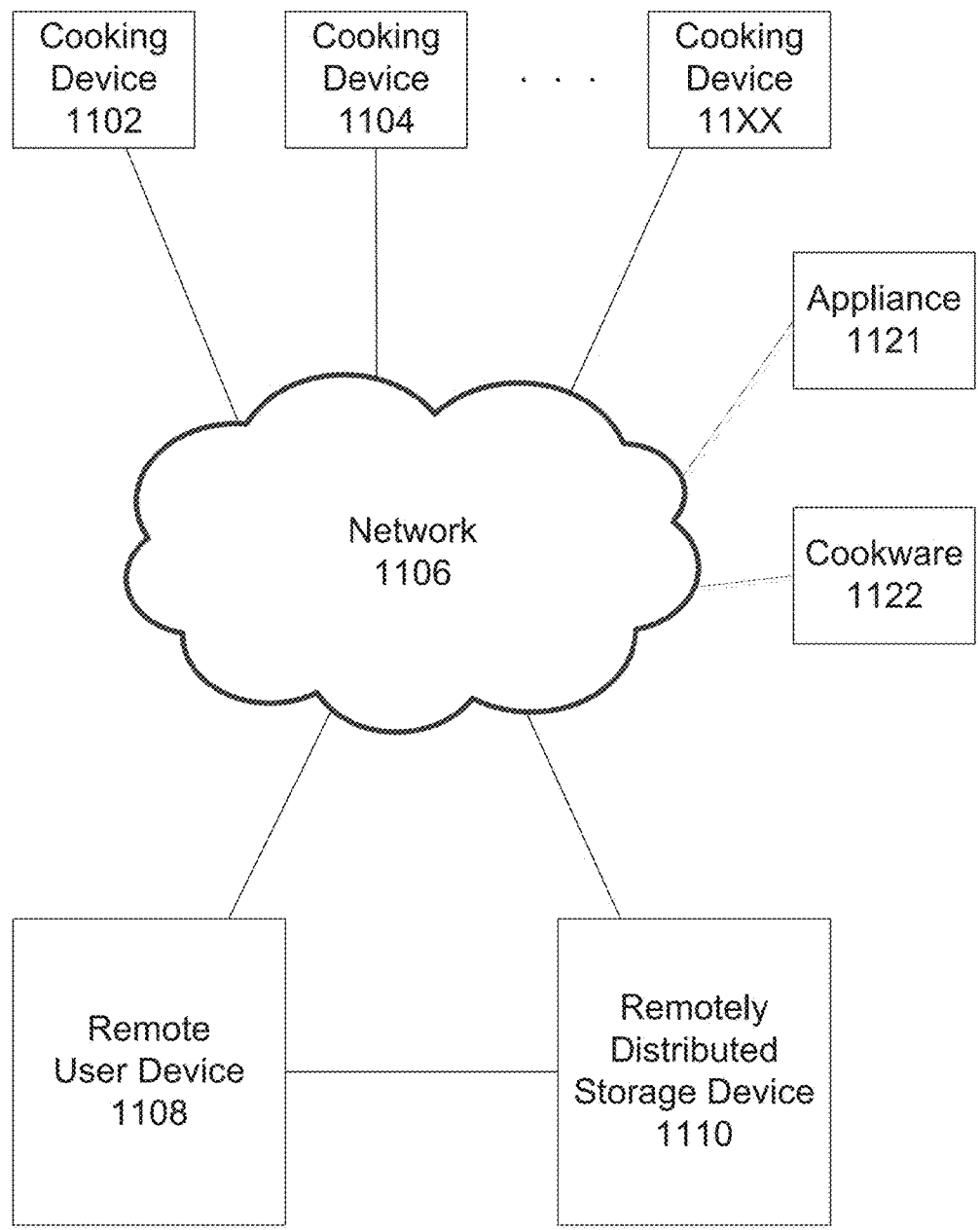
FIG. 11 depicts a sample network overview for using and recording information related to the use of a smart cooking system according to an embodiment.

FIG. 11 illustrates a sample network overview for implementing the smart cooking system as taught and described herein. The network may include any number of smart cooking devices 1102, 1104, . . . , 11XX. Optionally, the network also may include an optionally-connected cookware item 1122 such as a frying pan or pot, and an optionally-connected cooking appliance 1121 such as a gas range. Each of the smart cooking devices 1102, 1104, . . . , 11XX may be operably connected to a data communication network 1106. The data communication network 1106 may include, for example, a local area network such as an intranet, or a wide area network such as the Internet. A remote user computing device may be operably connected to the smart computing devices 1102, 1104, . . . , 11XX via the network 1106. Similarly, a remotely distributed storage device 1110 may be operably connected to the smart cooking devices 1102, 1104, . . . , 11XX via the network 1106. Such as arrangement provides for information related to the use of, for example, smart cooking device 1102 to be recorded on the remote computing device 1108 and/or the remotely distributed storage device 1110. Thus, a local copy of a cooking activity record may be stored on the remote computing device 1108, and a cloud-based version of the cooking activity record may be remotely stored on the remotely distributed storage device 1110.

Figure 12A:
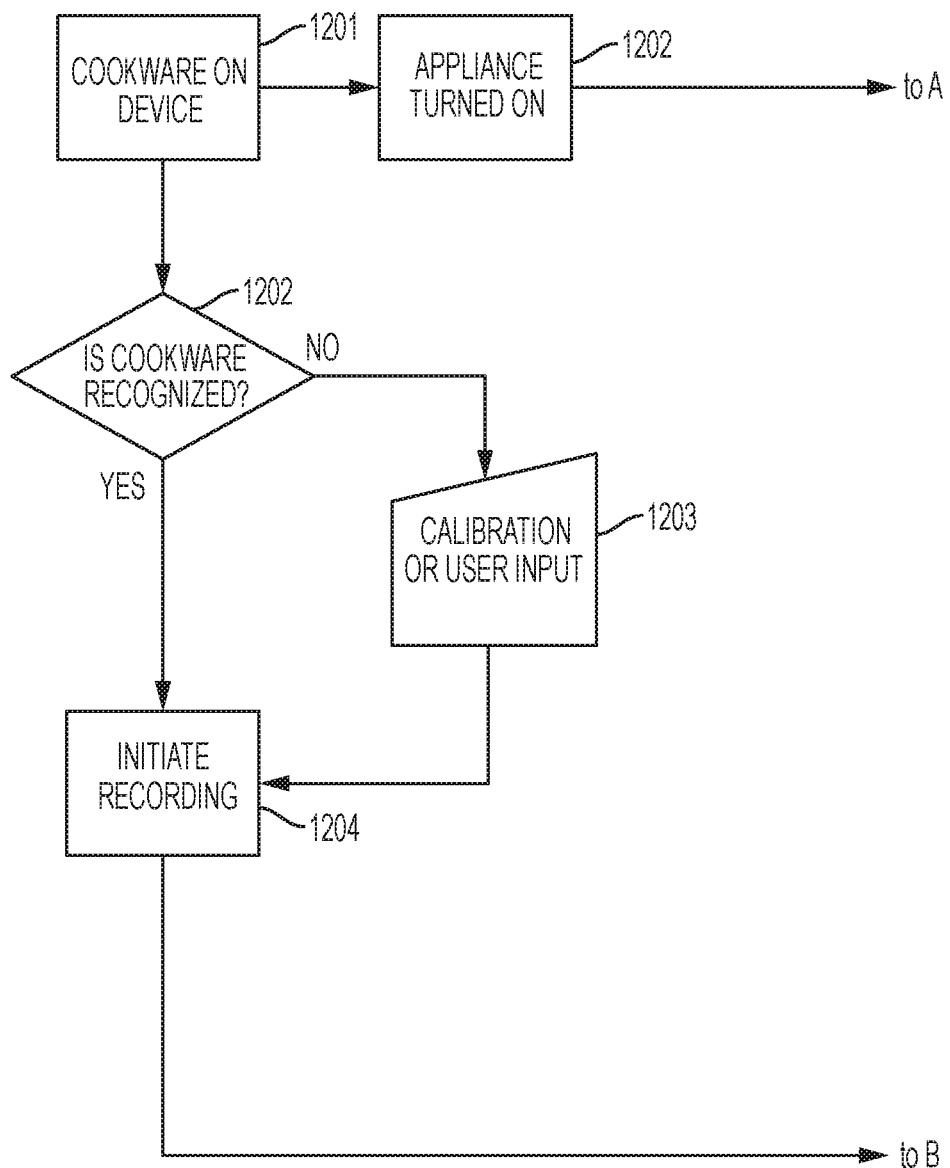
FIGS. 12A and 12B illustrate an additional example of a recipe recording process.
Figure 12B:
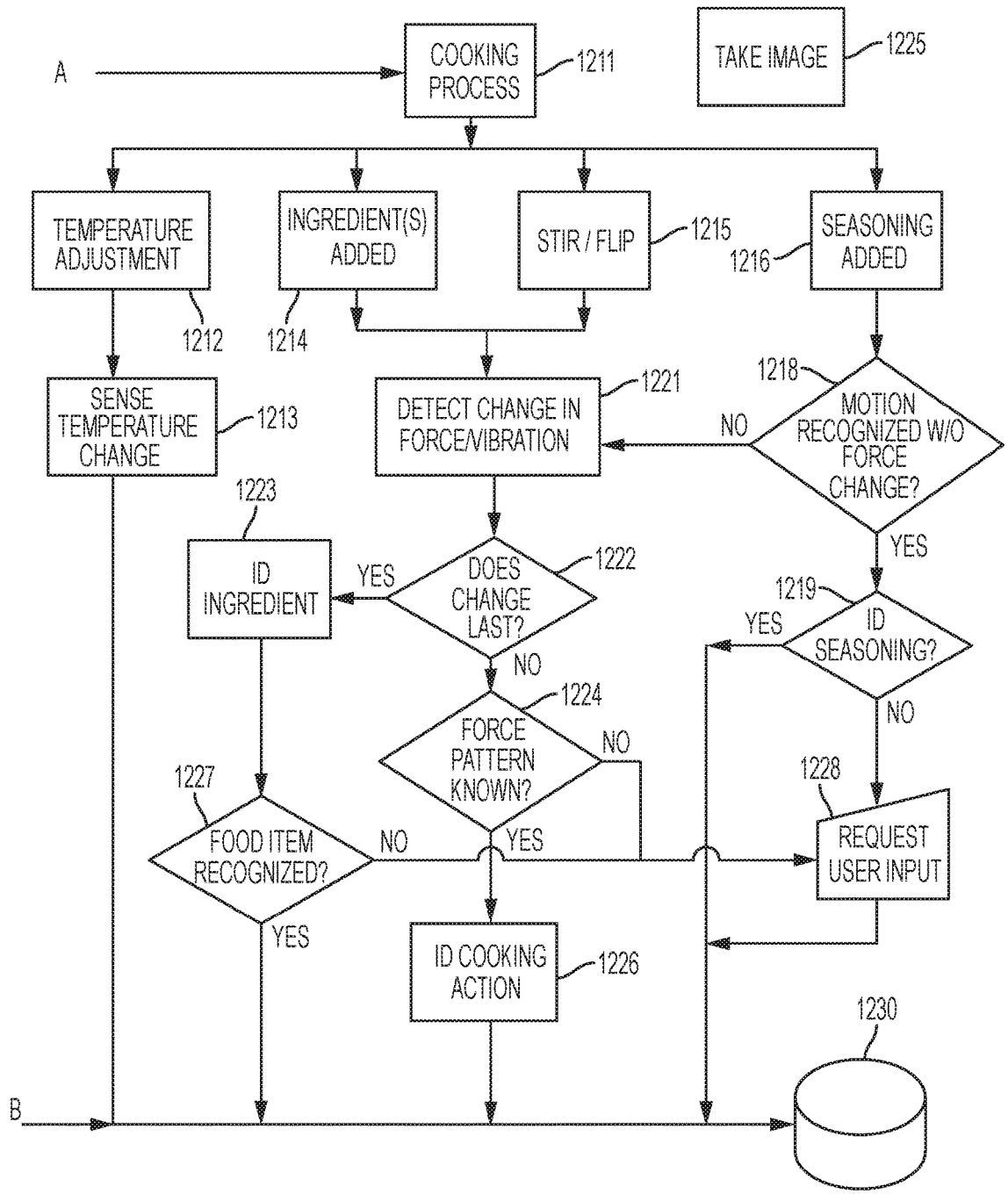

FIGS. 12A-B and 13A-B illustrate additional examples of a recording and playback process, respectively. Referring to FIGS. 12A and 12B, the system may record a cooking process and save the process as a digital recipe file by the smart cooking device detecting 1201 that a cookware item (such as a pan) has been placed on top of it, based on the device's force sensor's detection of a weight being placed on the device. The smart cooking device or remote computing device will implement a process to determine whether the cookware is known to the system 1202. It may do this by receiving a description of the cookware item via a user interface (such as a keypad or microphone), by detecting a token, tag or barcode on the cookware item, by capturing or receiving and analyzing an image of the item, or by other suitable means and determining whether the system has stored a profile (e.g., with weight and/or materials data) for the cookware item. If so, then it may initiate recording 1204 and wait for the user to begin the cooking process 1211. If not, then the system may prompt the user to manually input data about the cookware and/or perform a calibration process 1203 for the cookware such as the calibration processes described above. The system may save a profile for the cookware using data collected during the calibration process and/or manually entered data.

Once the cookware item has been identified or calibrated, and when the appliance has been turned on 1210, the user may use the cookware to cook food 1211. The smart cooking device's sensors may detect various actions of the user during cooking. For example, if the user adds ingredients 1214, or stirs or flips the food in the cookware 1216, the force and/or vibration sensors may detect 1221 changes in force applied to or vibration of the smart cooking device. If an increase in force endures for at least a threshold period of time 1222, the system may detect that an ingredient has been added 1223. The system may determine whether it can recognize the added item 1227 based on the force and/or vibration signatures, by an image captured by a camera of the system, or by receiving user input that identifies the item (and by comparing that data to a data store of known ingredients and corresponding images or force/vibration signatures). If the system cannot recognize the food item, the remote electronic device may prompt the user to enter 1228, and the system may thus receive, an identification of the food item using a keypad or microphone input. The system may record the added ingredient, time added, detected weight, sensed temperature, and/or other sensed data to a memory to become part of the final digital recipe file.

If the change in force does not last beyond a threshold period of time 1222, then the system may analyze the data collected by the force and vibration sensors to determine whether the data corresponds to a known pattern of movement 1224, such as stirring or flipping. If the action is known (based on a data store of known movement patterns), the system may recognize 1226 the cooking action, and the system may record 1230 the action, temperature, time and/or other data to the digital recipe file. If the action is not known, then the system may prompt the user to enter 1228, and the system may thus receive, an identification of the cooking action and record 1230 the action, temperature, time, force and vibration signature and/or other data to the digital recipe file.

Optionally, the system also may capture one or more images 1225 of the cooking action and save the images along with detected force and vibration signatures to a data store of cooking activity data for use in recognizing future cooking actions.

Some user actions, such as adding seasoning 1216, may not be recognized by force sensors, but instead may be detected by a camera or by manual voice or text-based input. If so, then if a motion is detected by a camera that is facing the cookware 1217 without any significant change in force (and optionally vibration) 1218, the system may identify that seasoning has been added 1219. The system may then prompt the user to enter 1220, and the system may thus receive, an identification of the seasoning and its amount and record 1230 the seasoning, the amount of seasoning, temperature, time, and/or other data to the digital recipe file. Optionally, the system may include a sharing feature with a prompt that, when selected, will cause the digital recipe file to be shared with others via a messaging service or a social media service.

Figure 13A:
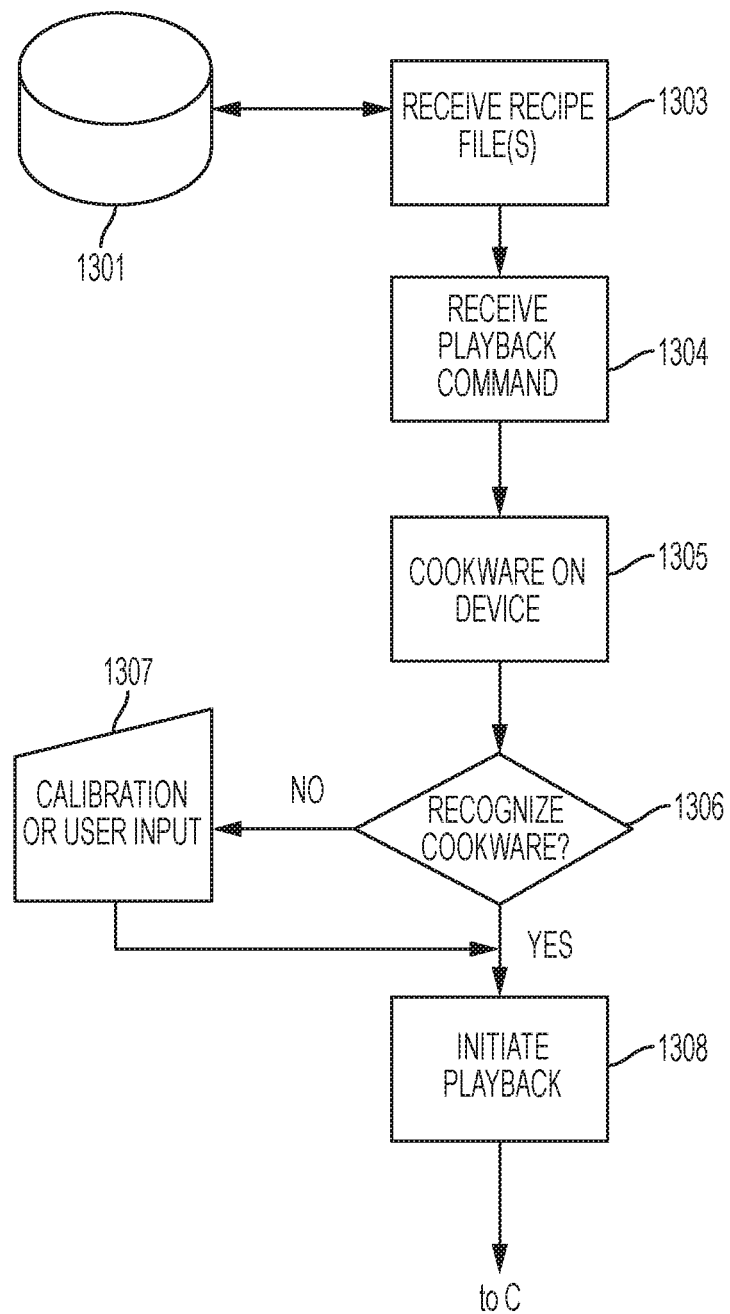
FIGS. 13A and 13B illustrate an additional example of a recipe playback process.
Figure 13B:
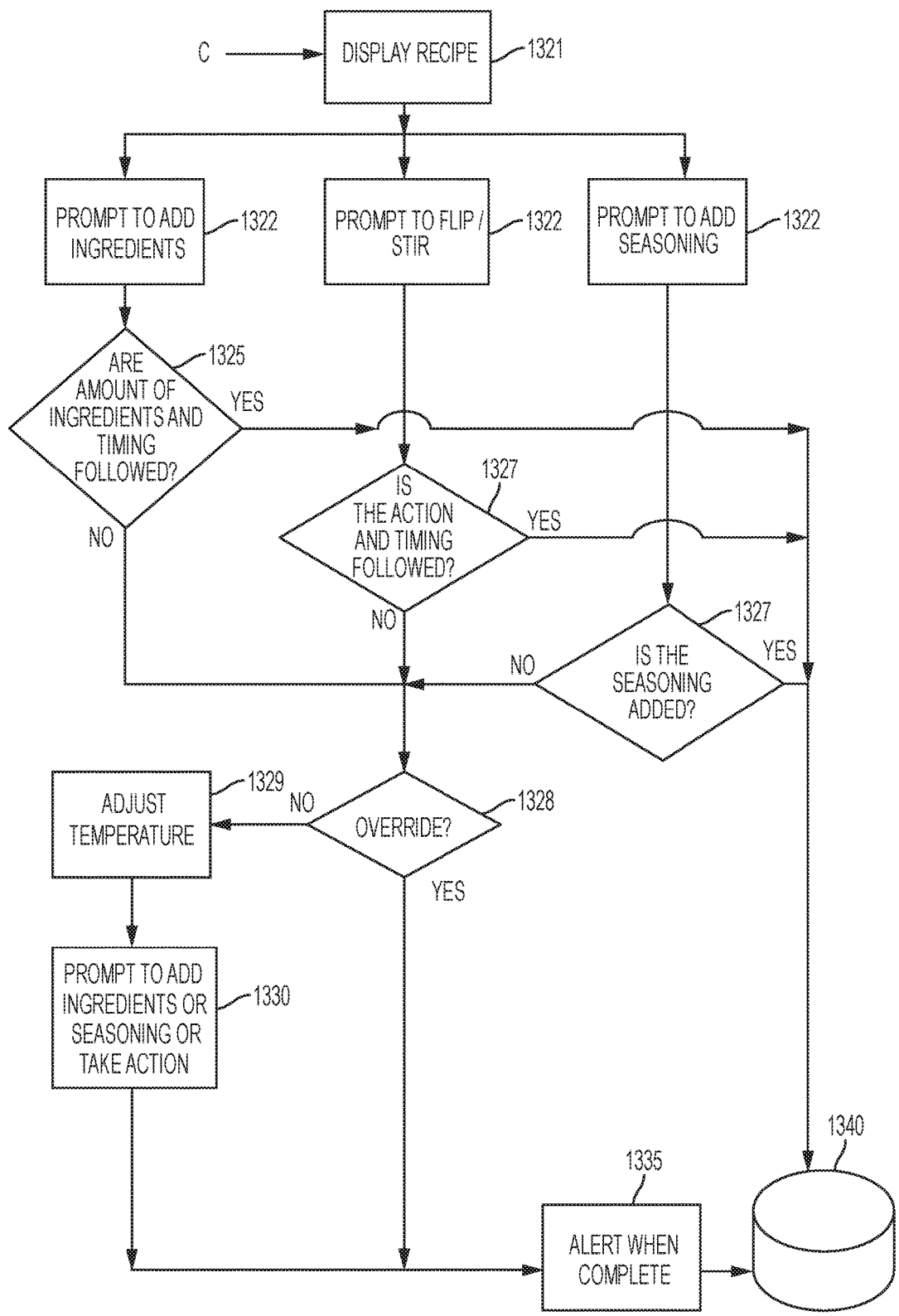

FIGS. 13A and 13B depict how the system may use a digital recipe file to guide a user through a cooking process. The user may use the remote electronic device to access a local or remote database 1301 of digital recipe files. When the user selects one of the files 1303 the system may extract a copy of the file or relevant data from the file from the database so that the electronic device can use the device to "play" the recipe back 1304. Playback will include displaying certain details of the recipe on a display of the electronic device 1321 in video, still image and/or text format, and/or providing an audio output containing cooking instructions from the recipe, as well as monitoring the smart cooking device to determine whether the device is detecting cooking actions that are consistent with those expected (as stored in the digital recipe file). The system may determine whether the smart cooking device has detected placement of cookware on the smart cooking device 1305 (based on sensed force and identification detection steps as described above). If the system detects a known cookware item 1306, it may retrieve a profile of the cookware item and use the profile to continue playback of the recipe 1308. If the cookware item is not known, the system may prompt the user to enter data about the cookware item or initiate a calibration process 1307 as described above.

Once the system has identified a known cookware item, the remote computing device may receive sensed data from the systems force, temperature, vibration and/or camera sensors and use the remote device's display and/or audio outputs to prompt the user when to perform various cooking actions, such as adding ingredients 1322, stirring or flipping the food 1323, or adding seasoning. The system may them monitor the force sensor, vibration sensor, temperature sensor, and/or received images from the camera and determine whether the sensed parameters and times 1325, 1326, 1327 match or are within a determined acceptable range from the known parameters and times for the recipe. If the detected parameters correspond to the expected parameters of the recipe, the system may continue guiding the user through the recipe until the recipe is complete, and it may alert the user upon completion 1335. If a detected parameter does not correspond to the expected parameter, the system may output a notification to the user and determine (or allow the user to select) whether the parameter should be overridden 1328 because the user wants to adjust the recipe. If the step is not overridden then the system may prompt the user to take a corrective measure such as adjusting the temperature (heat output) of the appliance 1329 or add ingredients or take other action 1330. Optionally, the system may record the result to the recipe file or an updated recipe file, optionally with any user-entered modifications to the actions, temperature, ingredients, or other parameters of the recipe 1340.

Figure 14:
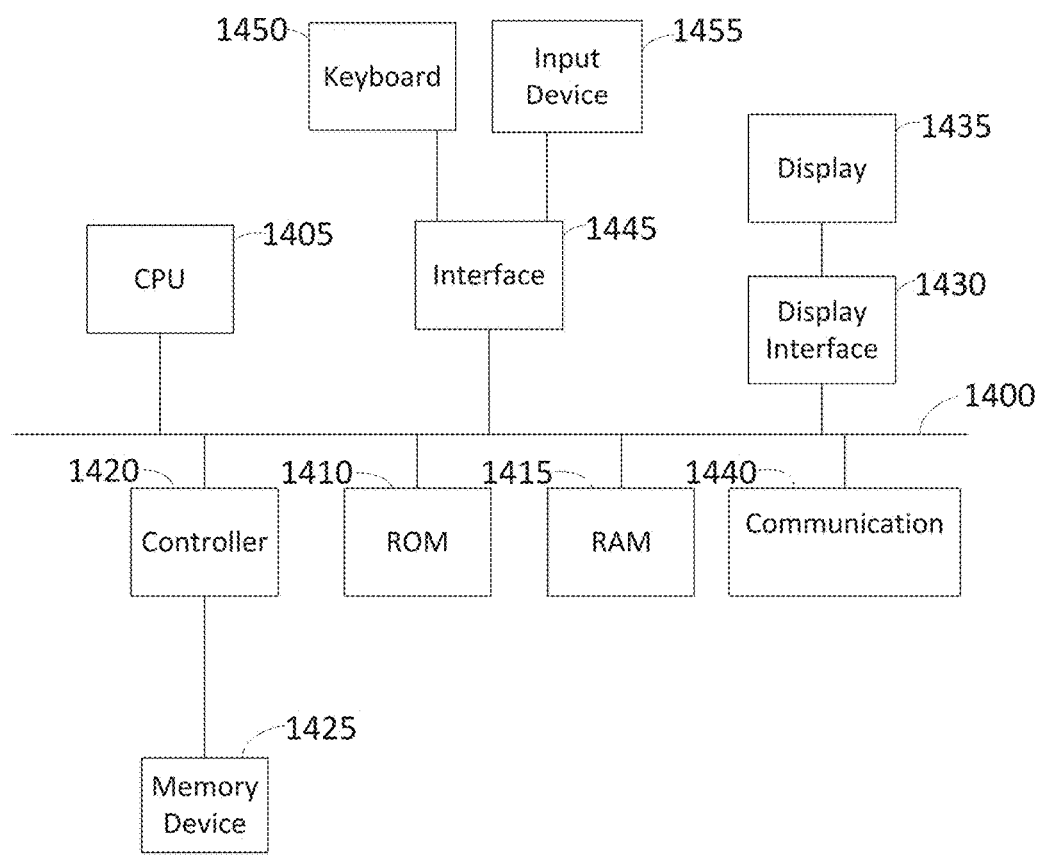
FIG. 14 depicts a block diagram of illustrative internal hardware that may be used to contain or implement program instructions according to various embodiments.

FIG. 14 depicts a block diagram of illustrative internal hardware that may be included in, for example, a remote computing device such as remote computing device 1108 as shown in FIG. 11. Similarly, the internal hardware as shown in FIG. 14 may be included in a remote storage device such as the remotely distributed storage device 1110 as shown in FIG. 11. Referring to FIG. 14, a bus 1400 may serve as the main information highway interconnecting the other illustrated components of the hardware. CPU 1405 represents a processor of the system, performing calculations and logic operations required to execute a program. The CPU 1405, alone or in conjunction with one or more of the other elements disclosed in FIG. 14, is an illustrative processing device, computing device or processing device as such terms are used within this disclosure. When this disclosure uses the term "processor" or "processing device" it is intended to include both embodiments in which a single processor is used and embodiments in which multiple processors together perform various steps of a process.

Read only memory (ROM) 1410 and random access memory (RAM) 1415 constitute illustrative memory devices (such as, for example, processing device-readable non-transitory storage media). When this disclosure uses terms such as "memory device" or "computer readable medium," it is intended to refer to one or more non-transitory storage devices on which data and/or programming instructions may be stored as software or firmware.

A controller 1420 interfaces with one or more optional memory devices 1425 to the system bus 1400. These memory devices 1425 may include, for example, an external or internal hard drive, an optical disc drive, a hard drive, flash memory, a USB drive, or the like. As indicated previously, these various drives and controllers are optional devices.

Program instructions, software, or interactive modules for providing the interface and performing any querying or analysis associated with one or more data sets may be stored in the ROM 1410 and/or the RAM 1415. Optionally, the program instructions may be stored on a non-transitory computer-readable medium such as the memory devices described above.

An optional display interface 1430 may permit information from the bus 1400 to be displayed on the display device 1435 in audio, visual, graphic, or alphanumeric format, such as the interface previously described herein. Communication with external devices, such as a print device, may occur using various communication ports 1440. An illustrative communication port 1440 may be attached to a communications network, such as the Internet, an intranet, or the like.

The hardware may also include a user input interface 1445 which allows for receipt of data from user input devices such as a keyboard 1450 or other input device 1455 such as a microphone, mouse, a joystick, a touch screen, a remote control, a pointing device, or a camera.

The hardware may also include a data storage device 1460 such as, for example, a connected storage device, a server, or an offsite remote storage device. Illustrative offsite remote storage devices may include hard disk drives, optical drives, tape drives, cloud storage drives, and/or the like. The storage device 1460 may be configured to store data as described herein, which may optionally be stored on a database 1465. The database 1465 may be configured to store information in such a manner that it can be indexed and searched, as described herein.

In the above detailed description, reference is made to the accompanying drawings, which form a part of this document. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described in this document, and illustrated in the Figures, can be arranged, substituted, combined, separated, and designed in a wide variety of different configurations, all of which are explicitly contemplated in this document.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used in this document is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein in this document sake of clarity.

It will be understood by those within the art that, in general, terms used in this document, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A smart cooking system comprising:
    a heat transfer housing comprising a first side configured to fit over a heating element of a cooking appliance and an opposing second side configured to receive a cookware item, the heat transfer item configured to pass heat from the heating element to the cookware item when the heat transfer housing is positioned over the heating element;
    a heat resistant housing that is connected to the heat transfer housing and that at least partially holds a communication device;
    a plurality of sensors connected to or contained within the heat transfer housing, wherein the sensors:
        are configured to measure quantifiable data associated with a cooking process performed when the heating element is operating and the cookware item holds food,
        comprise at least a force sensor, and
        are communicatively connected to a communication device; and
    wherein the communication device is communicatively connected to the sensors and configured to:
        establish a connection with a remote computing device,
        receive cooking process information from the sensors, and
        transmit the cooking process information to the remote computing device; and
    the system further comprises programming instructions that are configured to cause the remote computing device to:
        receive a user selection of a recipe for the cooking process,
        retrieve a digital recipe file that is associated with the recipe,
        determine whether the cookware item is a known cookware item by matching a weight of the cookware item obtained from the force sensor to a stored cookware profile, wherein the stored cookware profile includes at least a weight of the cookware item and a material of the cookware item,
        if the cookware item is not a known cookware item, use the smart cooking device to perform a calibration process for the cookware item to generate a profile of the cookware item, and
        play back the digital recipe file by:
            outputting, via user interface, steps of the recipe;
            receiving, from the force sensor of the cooking device, detected force data,
            determining whether the detected force data corresponds to expected force data associated with a previously-output step of the recipe; and
            if the detected force data does not correspond to the expected force data, generating a prompt to alert the user to take a cooking action associated with the previously-output step and the expected force data.

2. The smart cooking system of claim 1, further comprising the remote computing device, which comprises:
   a processing device;
   a non-transitory computer readable medium operably connected to the processing device and configured to store one or more instructions for execution by the processing device during operation of the smart cooking device.

3. The smart cooking system of claim 2, wherein the instructions are configured to cause the remote computing device to:
   receive the cooking process information from the communication device, wherein the cooking process information comprises force, temperature and time data associated with the cooking process;
   receive, via a user interface, user input that is descriptive of steps of the cooking process;
   correlate the force, temperature and time data with the described steps to generate the recipe for the cooking process; and
   create and store the digital recipe file that is associated with the recipe for the cooking process based upon the correlated vibration, force, temperature and time data.

4. The smart cooking system of claim 3, wherein the sensors further comprise a vibration sensor, the cooking process information also includes vibration data captured by the vibration sensor, and the instructions also are configured to cause the remote computing device to:
   correlate the vibration data with the described steps; and
   include the correlated vibration data with the described steps in the digital recipe file.

5. The smart cooking system of claim 1, wherein the sensors further comprise a temperature sensor configured to measure an amount of heat applied to the heat transfer housing.

6. The smart cooking system of claim 1, further comprising a power source operably connected to provide power to electrical components contained with heat transfer housing or the heat resistant housing.

7. The smart cooking system of claim 1, further comprising a camera positioned to capture an image of food placed in the cookware item.

8. The smart cooking system of claim 1, wherein:
   the sensors also comprise a vibration sensor; and
   the programming instructions that are configured to cause the remote computing device to play back the digital recipe also comprise instructions to:
      receive, from the vibration sensor, detected vibration data,
      determine whether the detected vibration data corresponds to expected vibration data associated with a previously-output step of the recipe, and
      if the detected vibration data does not correspond to the expected force data, generate a prompt to alert the user to take a cooking action associated with the previously-output step and the expected vibration data.

9. The smart cooking system of claim 1, wherein:
   the sensors also comprise a temperature sensor; and
   the programming instructions that are configured to cause the remote computing device to play back the digital recipe also comprise instructions to:
      receive, from the temperature sensor, detected temperature data,
      determine that the detected temperature data does not correspond to expected temperature data associated with a previously-output step of the recipe, and
      if the detected temperature data does not correspond to the expected temperature data, generate a prompt to alert the user to adjust a temperature of the heating element.

10. The smart cooking system of claim 1, wherein the programming instructions that are configured to cause the remote computing device to play back the digital recipe also comprise instructions to:
   receive, from one or more of the sensors, one or more detected cooking parameters;
   determine that the one or more detected cooking parameters do not correspond to an expected cooking parameter set associated with a previously-output step of the recipe;
   generate a prompt to alert the user to take an action associated with the previously-output step and the expected cooking parameter set;
   receive, from the user, an override of the expected cooking parameter set, wherein the override includes an alternate cooking parameter; and
   save a digital data file comprising a modified version of the recipe with the alternate cooking parameter.

11. The smart cooking system of claim 1, further comprising a temperature regulating device positioned under the heat transfer housing and configured to regulate heat generated by the heating element via a valve that movably extends into and withdraws from the heating element.

12. A system for aiding a cooking process, the system comprising:
   a cooking device comprising a heat transfer housing configured to receive and hold a cookware item over a heating element of a cooking appliance, a heat resistant housing that is connected to the heat transfer housing and that at least partially holds a communication device, the cooking device also including a force sensor configured to detect force data when the cookware item is positioned on the smart cooking device and when a cooking process occurs; and
   one or more remote computing devices communicatively connected to the cooking device via the communication device and containing programming instructions configured to cause the one or more remote computing devices to:
      receive the force data,
      receive temperature and time data associated with the cooking process,
      receive, via a user interface of the remote computing device, a user input that is descriptive of steps of the cooking process,
      correlate the force, temperature and time data with the described steps to generate a recipe for the cooking process, and
      create and store a digital recipe file of the recipe for the cooking process based upon the processed vibration, force, temperature and time data; and
   additional programming instructions configured to cause the one or more remote computing devices to:
      receive a user selection of the recipe,
      determine whether the cookware item is a known cookware item by matching a weight of the cookware item obtained from the force sensor to a stored cookware profile, wherein the stored cookware profile includes at least a weight of the cookware item and a material of the cookware item, if the cookware item is not a known cookware item, use the smart cooking device to perform a calibration process for the cookware item to generate a profile of the cookware item, if the cookware item is a known cookware item, retrieve a profile of the known cookware item, and play back the digital recipe file by:
- outputting, via user interface, steps of the recipe;
- receiving, from the force sensor of the cooking device, detected force data;
- determining whether the detected force data corresponds to expected force data associated with a previously-output step of the recipe; and
- if the detected force data does not correspond to the expected force data, generating a prompt to alert the user to take a cooking action associated with the previously-output step and the expected force data.

13. The system of claim 12, wherein the sensors further comprise a vibration sensor, and the instructions also are configured to cause the one or more remote computing devices to:
- receive, from the vibration sensor, vibration data;
- correlate the vibration data with the described steps; and
- include the correlated vibration data with the described steps in the digital recipe file.

14. The system of claim 12, further comprising:
- a camera positioned to capture an image of food placed in the cookware item; and
- additional programming instructions configured to cause the one or more remote computing devices to:
  - determine whether the image corresponds to a known ingredient, and
  - correlate the image with the force, temperature and time data to identify an additional step or further describe one of the described steps of the recipe.

15. The system of claim 12, further comprising additional programming instructions that are configured to cause the one or more remote computing devices to, when playing back the digital recipe file:
- receive, from a vibration sensor of the cooking device, detected vibration data;
- determine whether the detected vibration data corresponds to expected vibration data associated with a previously-output step of the recipe; and
- if the detected vibration data does not correspond to the expected force data, generate and output a prompt to alert the user to take a cooking action associated with the previously-output step and the expected vibration data.

16. The system of claim 12, further comprising additional programming instructions that are configured to cause the one or more remote computing devices to, when playing back the digital recipe file:
- receive, from a temperature sensor of or proximate to the cooking device, detected temperature data;
- determine whether the detected temperature data corresponds to expected temperature data associated with a previously-output step of the recipe; and
- if the detected temperature data does not correspond to the expected temperature data, generate a prompt to alert the user to adjust a temperature of the heating element.

17. The system of claim 12, further comprising additional programming instructions that are configured to cause the one or more remote computing devices to:
- receive, from a sensor of or proximate to the cooking device, a detected cooking parameter;
- determine whether the detected cooking parameter data corresponds to an expected cooking parameter associated with a previously-output step of the recipes; and if the detected cooking parameter does not correspond to the expected cooking parameter:
  - generate a prompt to alert the user to take an action associated with the previously-output step and the expected cooking parameter,
  - receive, from the user, an override of the expected cooking parameter, wherein the override includes an alternate cooking parameter, and
  - save a digital data file comprising a modified version of the recipe with the alternate cooking parameter.

* * * * *